INVENTOR
GEORGE J. EHNI III

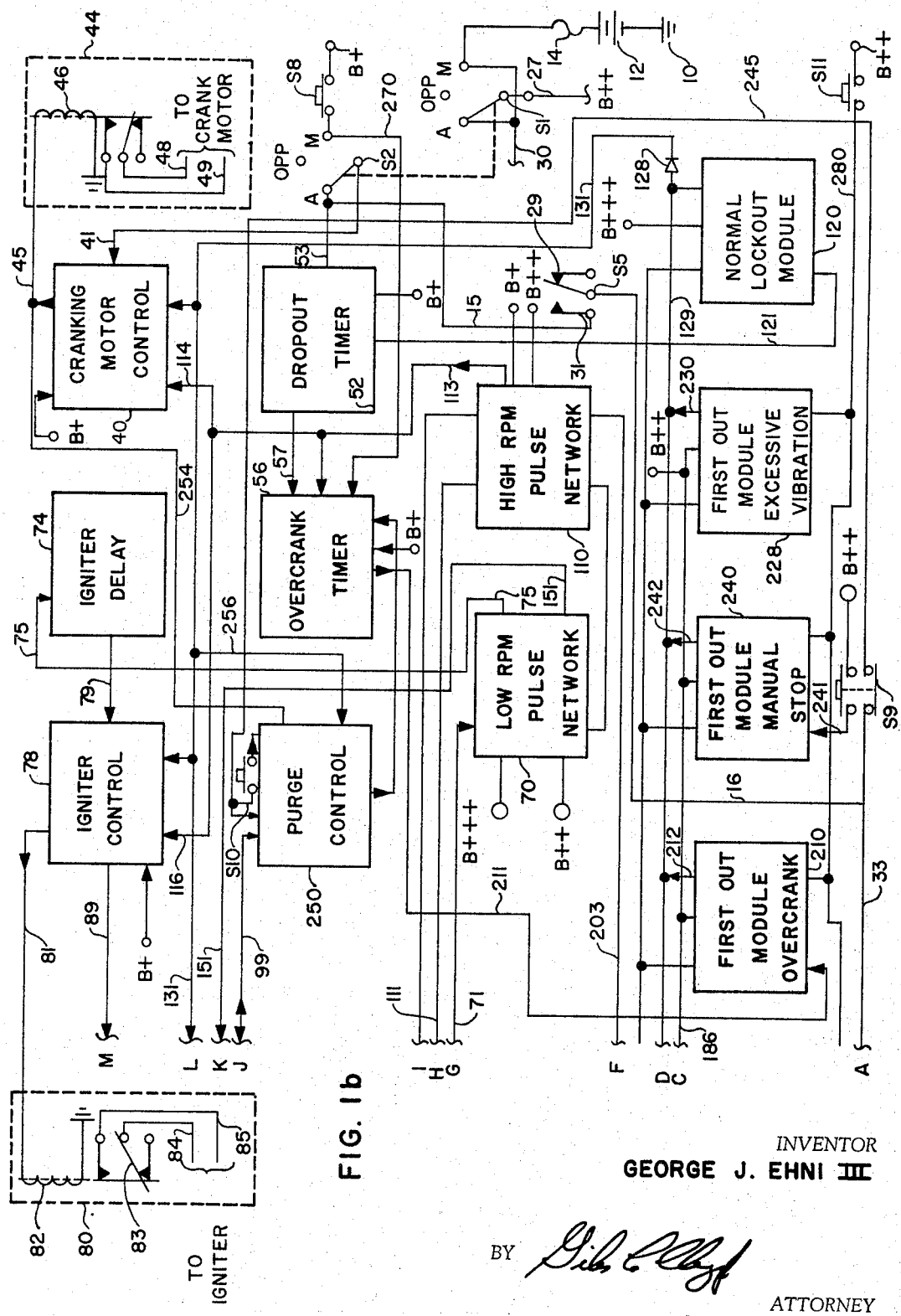

May 14, 1968      G. J. EHNI III      3,382,671
CONTROL FOR GAS TURBINE EMERGENCY POWER SYSTEM
Filed Dec. 16, 1965      8 Sheets-Sheet 3

INVENTOR
GEORGE J. EHNI III

BY
ATTORNEY

INVENTOR
GEORGE J. EHNI III

BY

ATTORNEY

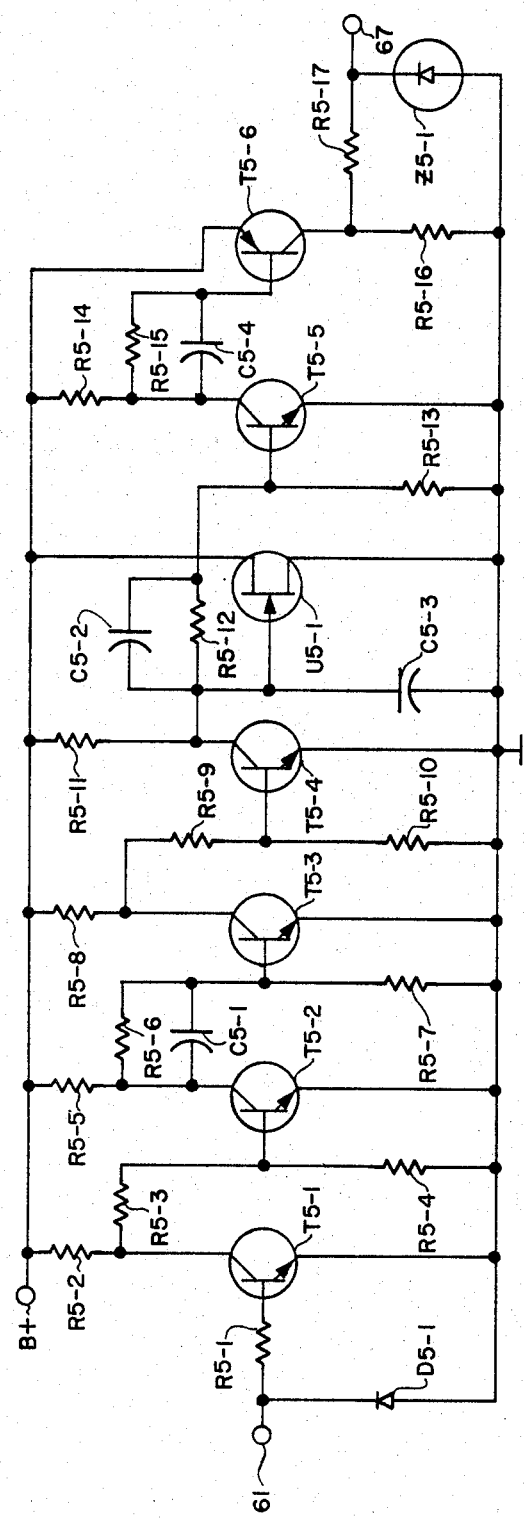
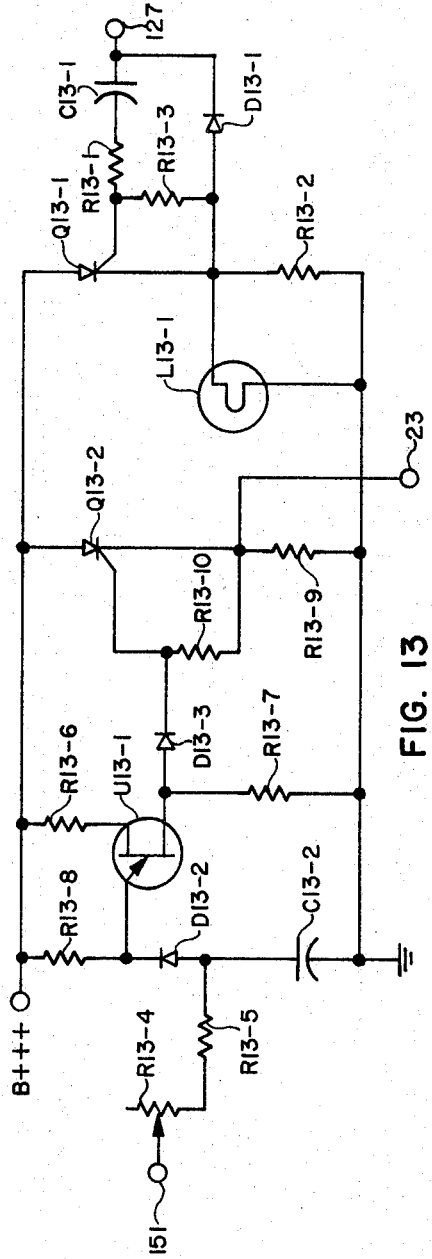

INVENTOR
GEORGE J. EHNI III

May 14, 1968          G. J. EHNI III          3,382,671

CONTROL FOR GAS TURBINE EMERGENCY POWER SYSTEM

Filed Dec. 16, 1965          8 Sheets-Sheet 7

INVENTOR
GEORGE J. EHNI III

BY *[signature]*

ATTORNEY

United States Patent Office 3,382,671
Patented May 14, 1968

3,382,671
CONTROL FOR GAS TURBINE EMERGENCY
POWER SYSTEM
George J. Ehni III, Dallas, Tex., assignor to Beta Corporation, Dallas, Tex., a corporation of Texas
Filed Dec. 16, 1965, Ser. No. 514,416
17 Claims. (Cl. 60—39.14)

ABSTRACT OF THE DISCLOSURE

The system disclosed utilizes solid state circuitry to automatically start a gas turbine driven generator when primary power is interrupted and for shutting down the generator system when primary power has been restored for at least a minimal length of time. The system is also one which is automatically shut down in the event of a malfunction in the turbine system, either during the starting or running cycle.

---

Gas turbines are used for the generation of electrical power for many purposes. One of the prime uses thereof is found in its application as an auxiliary electrical power source to be used in the event of the failure of a primary electrical power source. In many of the applications where the turbine is used as an auxiliary power source, it is advantageous for the turbine to be automatically controlled in its operation, wherein the turbine is turned on in the event of failure of a main power source and turned off upon the resumption of primary power. If the operation of the turbine is to be controlled automatically, several of its operating characteristics must be monitored to determine whether the turbine is operating normally and whether it should continue to run or be shut down.

Broadly, the present invention provides an automatic control system for the operation of a turbine which includes means for monitoring the speed thereof and other means for providing the controls for starting up the turbine which are responsive to the first mentioned means when the predetermined speed of the turbine is attained at which these controls become active. This system is adapted to operate a turbine for any purpose and can be caused to function in response to the manual closing of a switch or automatically in response to the failure of a primary power source. Further, in another embodiment, the invention additionally provides means for monitoring a plurality of different malfunctions that could possibly occur in the operation of the turbine, any one of which the system will detect and cause an automatic shutdown of the turbine. Should the control system be operative in response to the failure of a primary power source, the system is also responsive to the resumption of the main power source to automatically shut down the turbine.

Many objects, features and advantages will become readily apparent from the following detailed description of the preferred embodiment of the invention when taken in conjunction with the appended claims and the attached drawing wherein like reference numerals refer to like parts throughout the several figures, and in which:

FIGURES 1a and 1b are block diagrams of an automatic control system in accordance with the preferred embodiment of the invention;

FIGURE 2 is an electrical schematic diagram of a circuit used to control various switches and valves associated with the turbine which are external to the control system, wherein a circuit identical to that shown in FIGURE 2 is used in each of the circuit modules within the system that control, respectively, the operation of the cranking motor, the operation of the igniter and the operation of the fuel valve solenoid;

FIGURE 5 is an electrical schematic diagram of a speed switch used in the system which generates output pulses in response to an electrical signal input from a speed transducer coupled to the turbine, which output pulses can be integrated to provide an output signal which is a very accurate representation of the speed of the turbine;

Figure 11:
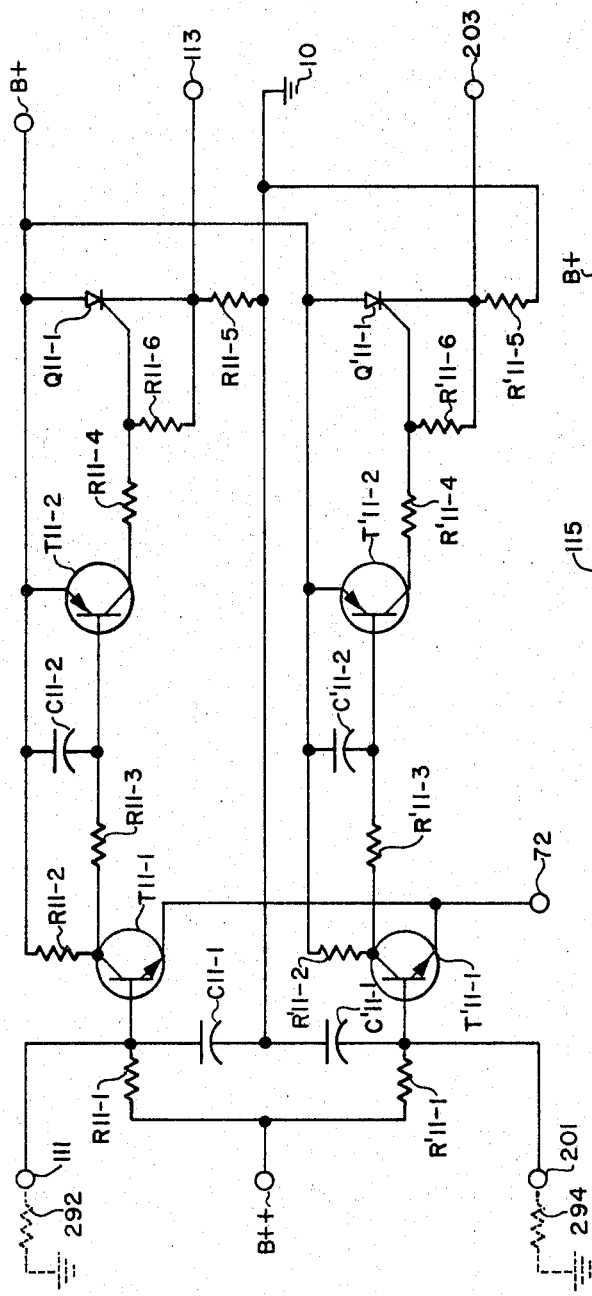
Figure 15:
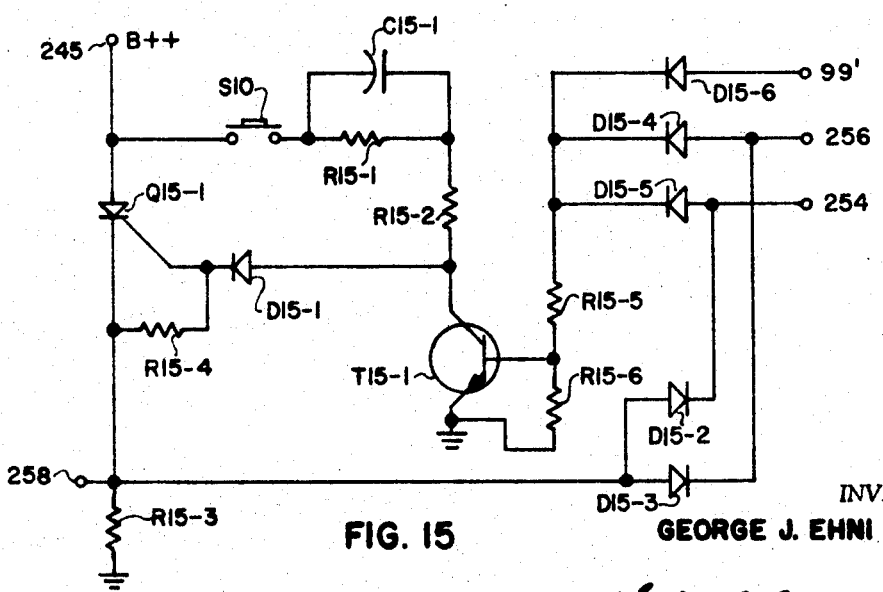
Figure 12:
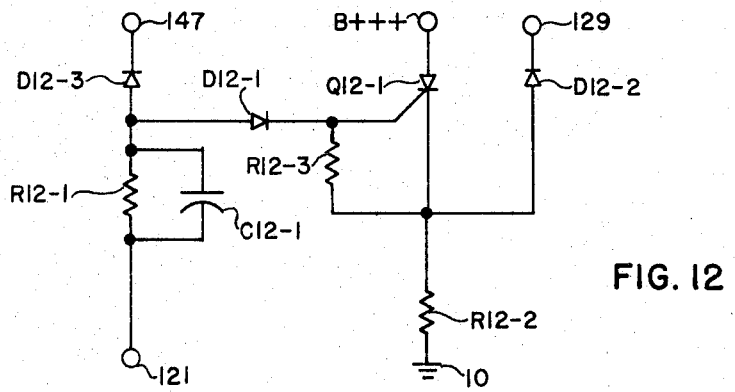
Figure 14:
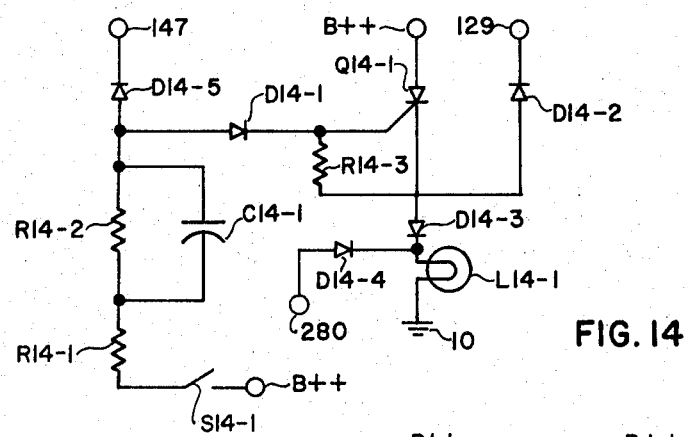

FIGURE 11 is an electrical schematic diagram of a high r.p.m. pulse network which operates in response to other output signals from the tachometer and meter relay generated when the turbine attains two predetermined higher speeds above the minimum speed, which circuit functions to inactivate the cranking motor control and ignition control upon the turbine reaching one of these speeds and to initiate shutdown of the turbine should the turbine attain the other predetermined speed indicative of an excessive speed;

FIGURE 12 is an electrical schematic diagram of a normal lockout module circuit which operates in response to a signal from the dropout timer when primary power has been resumed to initiate shutdown of the turbine;

FIGURE 13 is an electrical schematic diagram of a coastdown lockout circuit which operates in response to a signal from the low r.p.m. pulse network when the turbine decreases below the first minimum speed during shutdown thereof, which circuit generates an output signal after the turbine comes to rest to a reset relay within the system to reset the entire system for operation again;

FIGURE 14 is an electrical schematic diagram of one of a plurality of first out modules which operate in response to a signal from a malfunction detector to initiate shutdown of the turbine; and FIGURE 15 is an electrical schematic diagram of a fuel purge control circuit used in the system.

Figure 1A:
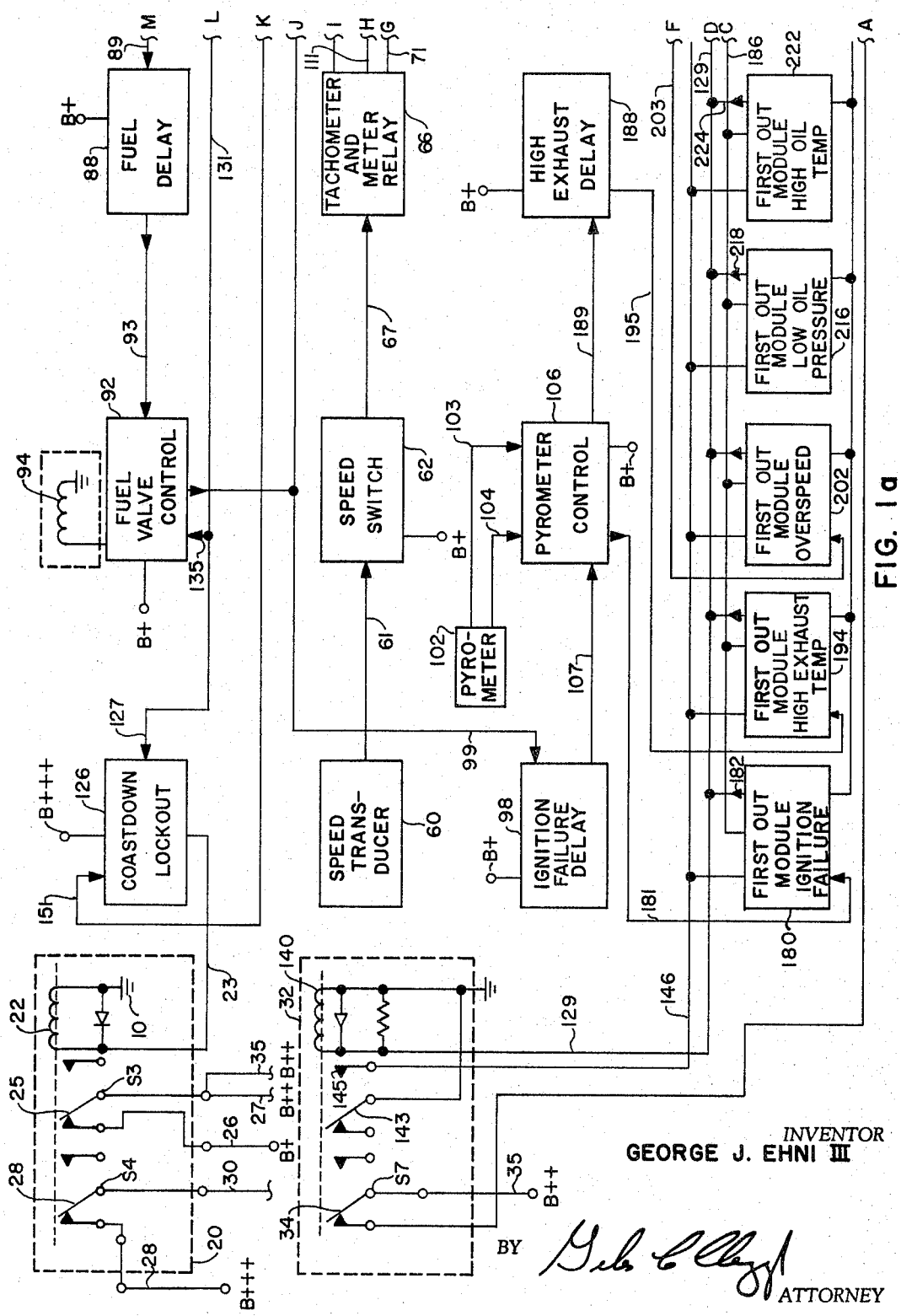

A block diagram of a preferred embodiment of the invention is shown in FIGURE 1. The system shown in FIGURES 1a and 1b are especially adapted for automatically controlling the operation of a turbine which drives an auxiliary power source used in the event of failure of a primary power source. A voltage source 12, such as a battery, is connected between ground 10 and a main switch $S_1$ through a suitable fuse 14. For the system to be described, the main voltage source 12 is preferably 24 volts, although other voltages can be used.

The main switch $S_1$ can be of the wafer type and has three positions, namely AUTOMATIC, OFF and MANUAL, with the voltage source being connected to both the Automatic and Manual poles. Another switch $S_2$ having the same three positions is operated in ganged relation to the main switch $S_1$. The purpose of main switch $S_1$ is to cause a supply voltage to be applied to the entire system through a reset relay 20 to be described below, such that voltage will be supplied to the system when main switch $S_1$ is in the automatic or manual positions but not in the off position. The purpose of switch $S_2$ is to select the mode of operation of the system, whether automatic or manual.

The reset relay 20, which derives voltage from switch $S_1$ to supply the entire system, comprises two switches $S_3$ and $S_4$ operated between two contact positions, respectively, by a relay coil 22. One terminal of this coil is connected to ground 10 and the other to connection 23 through which it is actuated, to be described later. Switch $S_3$ comprises a pole 25 which engages a first contact in the unactuated position, which contact will supply what will be referred to hereinafter as the B+ voltage through connection 26. Pole 25 of switch $S_3$ receives what will be referred to hereinafter as B++ voltage through connection 27 from switch $S_1$. Another switch $S_4$ comprises pole 28 which engages a first contact in the unactuated position, which contact will supply what will be referred to hereinafter as the B+++ voltage through connection 29.

All of these voltages are made available to the reset relay from switch $S_1$, wherein the connection 27 to the pole 25 of switch $S_3$ is connected to the pole of switch $S_1$, as shown. The connection 30 to the pole 28 of switch $S_4$ is connected directly to fuse 14. Thus voltage is made available to switch $S_3$ of the reset relay 20 from switch $S_1$ when the latter is in either the automatic or manual positions. However, voltage is always applied to switch $S_4$ and B+++ voltage is available at all times that the coil of the reset relay is not energized. Moreover, all of the B+, B++ and B+++ voltages are available when the reset relay is unactuated, whereas only B++ voltage is available when the reset relay is actuated by flow of current through connection 23 to the relay coil. As will be apparent, all of the voltages are the same magnitude, whereas the reason for distinguishing between them will become apparent later.

The system is operable to control the operation of a turbine, either automatically or in response to manual operation, wherein the automatic operation of the system will be described first. In the automatic operation of the system, it will be assumed that a source of primary power (not shown) is available and that the system will operate in response to the failure of electrical power of this primary system. To effect this, a dropout contact switch $S_5$ is actuated in response to failure of a main electrical source by any suitable relay coil (not shown). As shown in the drawing, the pole of switch $S_5$ is in engagement with a contact 29 thereof that indicates that the primary electrical power source has not failed. This switch is connected through its pole by connections 16 and 33 to one contact of switch $S_7$ of a first out relay 32. The other contact 31 of switch $S_5$ is connected by connection 15 to the AUTO contact of switch $S_2$. Switch $S_7$ of first out relay 32 is actuated by a relay coil 140, to be described later, but in its unactuated position, the contact which is connected to the pole of switch $S_5$ is in engagement with pole 34, the latter of which is connected to B++ of the reset relay 20 through connection 35. Upon failure of the primary power source, dropout contact of switch $S_5$ is closed to apply B++ to the AUTO pole of switch $S_2$ through the dropout switch $S_5$, first out relay 32 and reset relay 20 from battery source 12. It is with reference to this particular occurrence that the description of the system will proceed.

To control the operation of a turbine (not shown) so as to provide auxiliary power upon failure of a primary power source, the system of the invention provides means for cranking the turbine initially to start it running, an igniter system for igniting the turbine, a fuel control means for supplying fuel to the turbine, and various other means to monitor the operation of the turbine to determine if it is functioning properly. These means are utilized in a particular sequence during the starting up of the turbine. The system also provides various means for shutting down the turbine upon the occurrence of any one of various malfunctions, or when primary power is returned. Various malfunction means are utilized in the system to monitor the operation of the turbine and to shut it down should a malfunction occur, all as will be described below.

In the event of a failure of the primary power source (not shown), dropout contacts in switch $S_5$ will close, causing B++, or 24 volts, to be applied to the input of a cranking motor control 40 through switch $S_2$ and connection 41, and to a dropout timer 52 through connection 53. Upon the application of the positive voltage input to the cranking motor control, the latter will apply +24 volts to the relay coil 46 of a cranking relay 44 through connection 45. When coil 46 is energized, power will be applied to start the cranking motor through electrical connections 48 and 49. The cranking motor is not shown, but is of the conventional type mechanically connected to the turbine to crank the turbine to initiate its operation. Other inputs are provided to the cranking motor control, as will be described below, which permit the cranking motor control to be inactivated upon the application thereof of a positive voltage to any one of these inputs when it is desired to shut down the cranking motor.

As noted above, +24 volts is also applied to the input of the dropout timer 52, which in turn, also causes the application of a +24 volts to the input of an overcrank timer 56 through connection 57. The purpose of the dropout timer is to initiate shutdown of the turbine upon the resumption of normal power, in which case the +24 volts is removed from the input thereof to cause a timing circuit incorporated therewithin to start running. If normal power remains on for at least two minutes, as monitored by the timing circuit within the dropout timer, the dropout timer will generate an output voltage to initiate shutdown of the turbine. It will be noted, however, that in some applications the time delay of two minutes can be eliminated, in which event shut down will occur at any time normal power again becomes available.

A timing circuit in the overcrank timer is also made operative in response to an input from the dropout timer, wherein the purpose of the overcrank timer is to insure that the cranking motor does not crank the turbine for more than a specified period of time. As will be explained, the turbine is normally ignited within the specified period of time, after which the cranking control will be deactivated to stop the cranking motor. However, should the turbine not become ignited within this time, which in this case is approximately 40 seconds, the overcrank timer will generate an output voltage to initiate shutdown of the turbine. In the event the primary power is resumed within the 40 second period after the dropout timer applies the input voltage to the overcrank timer, the overcrank timer will continue to function and the starting up procedure of the turbine will continue. The purpose for this is to make available the turbine generator power should the main power source again fail within two minutes after it has resumed. If the main power source stays on for more than this two minute interval, the dropout timer itself will initiate shutdown of the entire system.

Assuming the turbine is now being turned over, the cranking motor will increase the speed of the turbine as a function of time. A speed transducer 60 responsive to the speed of the turbine applies an input signal through connection 61 to a speed switch 62. A suitable transducer for this purpose is, for example, a magnetic reluctance pickup of the conventional type associated with the turbine shaft which produces three pulses for every revolution of the shaft of the turbine. The speed switch is responsive to each of these pulses and functions to generate at its output one voltage pulse for every pulse applied to its input, in which the output pulses are of very constant energy. These output pulses are applied to a tachometer and meter relay 66 through connection 67 to be integrated thereby, whereby the summing of the energy of the pulses per unit of time provides an indication of the speed of the turbine. Because of the extremely constant energy of the output pulses from the speed switch, it is apparent that a very accurate indication of speed is provided.

The tachometer and meter relay functions to produce output signals at various predetermined speeds of the turbine. During the start up procedure of the turbine, the tachometer and meter relay will generate an output signal upon the turbine reaching a first minimum speed, suitably 3000 r.p.m., and apply this signal to a low r.p.m. pulse network 70 through connection 71.

The function of the low r.p.m. pulse network 70 is to provide dual outputs. At one of these outputs there is generated +24 volts upon the application to the input thereof of the signal from the meter relay at 3000 r.p.m., while concurrently at the other output, there is maintained approximately ground potential. This is true for the turbine running at all speeds in excess of 3000 r.p.m. When the speed of the turbine falls below 3000 r.p.m. after attaining a speed in excess of 3000 r.p.m., no signal is applied to the input of the low r.p.m. pulse network, and the +24 volts remains at the first output but +24 volts is also produced at the second output. The low r.p.m. pulse network applies the +24 volts from its first output to the input of an igniter delay circuit 74 through connection 75.

The igniter delay incorporates a timing circuit which starts running in response to this input signal, and after a period of time as determined by the characteristics of the timing circuit, the igniter delay will produce +24 volts applied to the input of an igniter control 78 through connection 79. The reason for the delay in applying a signal to the igniter control after the turbine reaches a speed of 3000 r.p.m. is to allow a sufficient time after the cranking motor starts to crank the turbine to purge the turbine of all fuel before the igniter is actuated. As will be seen below, the igniter is actuated before fuel is applied. In many instances, however, the engine itself will be sufficiently purged by the time the speed of 3000 r.p.m. is attained to permit safe operation of the igniter relay 80, in which case the igniter delay 74 can be eliminated.

Upon application of the input signal to the igniter control 78, it will in turn apply a positive voltage to the relay coil 82 of an igniter relay 80 through connection 81, which causes a switch contact 83 therein to close to start an igniter in the turbine (not shown) through connections 84 and 85. As will be described later, there are additional inputs to the igniter control for purposes of deactivating this circuit at other prescribed times during the operation of the system.

Simultaneously with the application of the positive voltage to the igniter relay, there is generated at the output of the igniter control +24 volts applied to the input of a fuel delay circuit 88 through connection 89. The fuel delay circuit is essentially identical to the igniter delay circuit, and after a preset period of time from the time the input signal is applied thereto, it will produce a positive output voltage applied to the input of a fuel valve control 92 through connection 93. The purpose in the delay of the activation of the fuel valve control by means of the fuel delay circuit is to allow the igniter to become fully operative before fuel is applied to the turbine and to ensure the burning off of any fuel left in the turbine from any previous operation. The fuel delay is considered essential when natural gas or a vapor type fuel is used, but may be eliminated if a liquid fuel is used.

Upon the application of the positive voltage to the input of the fuel valve control, the latter applies a positive voltage to a fuel valve solenoid 94 to supply fuel to the turbine. Concurrent with the application of the positive voltage to the fuel valve solenoid, the fuel valve control also applies a positive output voltage to the input of an ignition failure delay circuit 98 through connection 99, and to an input of a purge control circuit 250 through connection 99, the purpose and function of the latter of which will be described later. The ignition failure delay 98 incorporates a timing circuit which starts running upon the application thereto of the positive voltage through connection 99, whereby the ignition failure delay will generate at its output +24 volts only after a preset period of time from the activation of this timing circuit.

A pyrometer 102 is utilized to measure the exhaust temperature of the turbine to determine whether it is too low or too high. If the exhaust temperature remains too low for too long a period of time after fuel is applied to the turbine, this is an indication that the turbine is not running under its own power and that there has been an ignition failure. In contrast to this, the exhaust temperature can exceed a safe level which will also be detected by the pyrometer. The pyrometer has two outputs at which positive voltages will be generated upon the detection of too low or too high an exhaust temperature, respectively. These two outputs 103 and 104 are applied to the two inputs of a pyrometer control 106 which is responsive to the pyrometer output signals.

Assuming that the turbine is functioning properly, its exhaust temperature will exceed the minimum temperature at which a signal would be generated by the pyrometer, but will not attain the maximum temperature at which another signal would be generated by the pyrometer. Thus no signal will be generated by the pyrometer when the exhaust temperature of the turbine is within this temperature range. As is apparent, a short period of time is needed to allow the exhaust temperature to reach this range after turbine ignition occurs and thus the reason for the timing delay circuit within the ignition failure delay. After this preset delay, the ignition failure delay 98 applies an input signal to the pyrometer control 106 through connection 107, but the pyrometer control itself will not generate an output signal if there is no signal input from the pyrometer. This means that the exhaust temperature of the turbine is in the proper range. Should the exhaust of the turbine be below the minimum temperature when the signal from the ignition failure delay is applied to the pyrometer control, the pyrometer control, because of the additional signal input from the pyrometer, will generate an output signal which will initiate shutdown of the turbine, which will be described later. Should the exhaust temperature ever exceed the maximum safe point, the pyrometer will apply a signal to the pyrometer control and the latter will produce another output signal to initiate shutdown regardless of the presence or non-presence of any signal from the ignition failure delay.

Assuming that the shutdown procedure has not been initiated up to this point, this will be an indication that the turbine is functioning properly during the startup procedure. When the turbine speed attains 12,000 r.p.m. as detected by speed transducer 60, speed switch 62 and tachometer meter relay 66, the meter relay 66 will generate another positive voltage output applied to a high r.p.m. pulse network 110 through connection 111. Upon this occurrence, the high r.p.m. pulse network will produce a positive voltage signal at one of its outputs 113 which will be applied to other inputs of the cranking motor control 40 through connection 114, over crank timer 56 through connection 155 and igniter control 78 through connection 116 to deactivate all of these circuits. These circuits are deactivated since there is no longer a necessity for cranking the turbine, which implies that the overchank timer is no longer needed to determine the length of time the turbine is cranked, and that the turbine ignition has become self-sustained, thus obviating the necessity of an igniter. At this time, the turbine will be running normally and the startup of the turbine will have been completed. All of the foregoing, it will be remembered, takes place in the stated sequence, if there is no malfunction causing an automatic shutdown procedure.

The normal shutdown procedure of the turbine will now be described upon the assumption that there is a resumption of primary power and that it is again available. Upon this occurrence, the dropout contacts will open and the positive voltage will no longer be applied to the input of the dropout timer. This causes the timing circuit within the dropout timer to start running, wherein this timer is preset to run for two minutes so that the dropout timer will produce an output signal only after this lapse of time. Assuming that the primary power source does not stay on for this length of time, the dropout contacts will again close, causing the stopping and resetting of the timer therewithin. Assuming the primary power stays on and is available for more than two minutes, the dropout timer produces a signal at its output which is applied to the input of the normal lockout module circuit 120 through connection 121. Upon this occurrence, the normal lockout module produces a positive output voltage which is applied through blocking diode 128 and connection 131 to another input 135 of fuel valve control 92 and to one input 127 of a coastdown lockout 126. The signal applied to the input of the fuel valve control deactivates this circuit and causes the fuel valve solenoid 94 to cut off. The reason for applying an input voltage to the coastdown lockout at this time is to cause a light switch on to indicate that shutdown has been initiated. The same output voltage produced by the normal lockout module is also applied through connection 129 to the first out relay 32 to deactivate all of the first out modules to be described in detail later, wherein these modules have the purpose of initiating shutdown of the turbine upon the occurrence of any of several operating malfunctions. The deactivation of the first out modules is effected by the voltage from the normal lockout module being applied to the relay coil 140 within the first out relay to switch pole 143 to apply ground potential through connection 145 and connection 146 to the inputs of the first out modules. Relay coil 140 also switches pole 34 to remove B++ from the dropout contact switch 55 through connections 33 and 16 to preclude the turbine from starting up again upon failure of the primary power prior to complete shutdown of the turbine. Such an attempt to start up the turbine at this time after the fuel and ignition have been removed and before the turbine has come to rest and has been purged can result in damage to the turbine. Moreover, B++ is also removed from the purge control circuit 250 through connections 33 and 245 through switch S₉ for purposes to be described later.

As the turbine begins to coast and slows down as a result of shutdown of fuel and passes 3000 r.p.m. going down, all as monitored by the speed transducer, speed switch and tachometer meter relay, the low r.p.m. pulse network will apply a positive output voltage from its second output to another input of the coastdown lockout 126 through connection 151. This will start the running of a timing circuit within the coastdown lockout, and after a preset time interval (in this case forty seconds), an output signal will be produced and applied to reset relay 20 through connection 23. The positive output voltage along connection 23 is applied to relay coil 22 which switches poles 25 and 28 to remove B+ and B+++ from all circuits within the system to which these voltages are applied. However, B++ is not removed from those circuits of the system to which it is connected.

It will be noted from FIGURE 1 that the circuits from which B+ is removed are the fuel valve control 92, the fuel delay 88, the igniter control 78, the cranking motor control 40, the dropout timer 52, the overcrank timer 56, the speed switch 62, the ignition failure delay 98, the pyrometer control 106, the high exhaust delay 188 (yet to be described), and the high r.p.m. pulse network 110. The circuits from which B+++ is removed are the coastdown lockout 126, the low r.p.m. pulse network 70 and the normal lockout module 120.

The coastdown lockout circuit 126 provides the 40 second delay to allow the turbine to completely stop before applying the signal to the reset relay. The reset relay, when actuated after this period of time, resets all of the circuits to which B+ and B+++ are applied, so that the system will be ready for operation again, but B++ is not removed from the first out modules, all as will be described more fully later.

The reset function provided by the coastdown lockout in conjunction with the reset relay is very important in that it permits restart only after operation of the relay subsequent to the speed of the turbine falling below a safe value. It will be noted that many turbines can be safely started when running at or below a desired speed, such as 3000 r.p.m., in which case the delay is not necessary.

Several circuit modules (referred to hereinafter as first out modules) are provided within this system to initiate shutdown of the turbine in the event that any one of several malfunctions is indicated. As referred to earlier, for example, in the event that the pyrometer should not indicate heat of at least the low set point at the time that the timer incorporated within the ignition failure delay 98 causes an output signal to be generated therefrom, ignition failure will be indicated. This indication is made possible in that the pyrometer control will produce an output signal in response to an input signal from ignition failure delay through connection 107 and the concurrent application of an input signal from pyrometer 102 through connection 103. The output signal from the pyrometer control will be applied to the input of an ignition failure, first out module 180 through connections 181.

The following discussion regarding a shutdown of the turbine as initiated by a malfunction will be on the assumption that shutdown has not been initiated by any other means. Application of this input signal to the ignition failure, first out module 180 will cause a light to be lit therewithin which indicates to the operator that there has been an ignition failure of the turbine. Moreover, the ignition failure, first out module 180 will generate an output voltage at output 182 which will be applied through diode 128 along connection 129 to the input 131 of cranking motor control 40, the input 133 of igniter control 78, the input 135 of fuel valve control 92, and the input of coastdown lockout 126. This output signal from the ignition failure, first out module will also be applied to the relay coil 140 within the first out relay 32 the same as in the case for the output signal from the normal lockout module in the normal shutdown procedure. That is, the output voltage from this first out module will be applied to the relay coil 140 of the first out relay, which will cause ground potential to be applied to all of the first out modules through connection 147 of switch S₆. This prevents any of the other first out modules from being activated, since shutdown has already been initiated. However, because of the nature of each of the first out module circuits, the ground potential applied from the first out relay to any particular module through connection 147 will have no effect on the output voltage thereof once it has been activated.

Thus upon the occurrence or generation of the output signal at output 182 of the ignition failure, first out module, shutdown of the turbine will proceed in the manner previously described. As noted above, B++ is applied to each of the first out modules so that the power will not be removed from these modules upon activation of the reset relay 20 during the shutdown procedure. The reason for this is so that the light within the particular first out module which detected malfunction will remain lit so that the operator can readily see what the malfunction is, even after the turbine has completely stopped. These circuits are reset, not by the reset relay, but by turning switch $S_1$ to the off position, which removes B++ from the switch of the reset relay to which the first out modules are connected.

In the event that the pyrometer should indicate a heat excess of the high set point (too high exhaust temperature), an output signal from the pyrometer will be applied to another input of the pyrometer control through connection 104 which will cause the pyrometer control to generate an output signal to the input of high exhaust delay 188 through connection 189. A timing circuit within the high exhaust delay will be activated upon this occurrence, and after a delay of forty seconds, the high exhaust delay will generate an output signal to the input of high exhaust temperature, first out module 194 through connection 195. The reason for incorporating the delay in the high exhaust delay circuit is to preclude an erroneous fault indication of high exhaust delay. That is to say, if the high exhaust temperature does not persist for at least forty seconds, the high exhaust delay will not generate an output signal to initiate shutdown of the turbine. Assuming a voltage is applied to the input of the high exhaust temperature first out module, a light will be lit within this first out module to indicate the malfunction and an output voltage will be generated at the output 196 hereto to be applied to the first out relay 32 and through diode 128 to the aforementioned circuits to initiate shutdown. All other first out modules will be deactivated through connection 146.

In the event that the turbine, when running, attains an excessive speed, and in this particular case 31,200 r.p.m., this speed will be detected through speed transducer 60, speed switch 62, tachometer meter relay 66 and high r.p.m. pulse network 110, in which case the high r.p.m. pulse network will apply an output voltage to the input of the overspeed, first out module 202 through connection 203. This will cause a light to be lit within this first out module and an output to be generated at output 204 thereof to initiate shutdown.

Several other malfunction indication circuits can be provided and are shown in the drawing, wherein it should be understood that the particular first out modules for indicating malfunctions are not shown by way of limitation but by way of examples only. For example, a low oil pressure, first out module 216 can be provided which incorporates a light and will generate an output signal at output 218 to initiate shutdown should low oil pressure be indicated. In this particular first out module, an oil pressure gage is considered to be included therewithin, which gage will be connected to a suitable voltage to cause activation of the module.

Another malfunction module, by way of example, is a high oil temperature, first out module 222 which incorporates its own oil temperature gage and will produce an output voltage at output 224 to initiate shutdown.

Another malfunction indicator, the overcrank, first out module 210 is responsive to a positive voltage to its input from overcrank timer 56 through connection 211. This will occur if the high r.p.m. pulse network does not generate a signal to the input of the overcrank timer and the cranking control 40 within forty seconds after initiation of operation of the turbine. In other words, this is an indication that the turbine has not reached a speed of 12,000 r.p.m. within this time period and is not running normally. Thus the overcrank, first out module will generate an output signal at output 212 to initiate shutdown in response to a positive voltage applied from the overcrank timer, and a suitable light will be lit within this module.

An excessive vibration, first out module 228 can be provided which incorporates its own vibration transducer to generate a signal causing a voltage output to be generated at output 230 thereof to initiate shutdown.

It will be apparent that a manual stop, first out module 240 is desirable to initiate shutdown by the operator other than by an automatic indication of a malfunction. To effect this, a push-button switch $S_9$ is connected between B++ voltage and an input connection 241 to the module. Thus upon pressing this button by the operator, a positive output voltage will be produced at output 242 to initiate shutdown. By pressing push-button switch $S_9$, which also opens a contact between B++, as derived from the reset relay through the first out relay, and the purge control circuit 250 through connection 245, the purge control module is deactivated for reasons which will become apparent later.

A purge control circuit 250 is provided for purging the fuel from the turbine after it has stopped and before it can be restarted to prevent preignition during start up. The purge control includes a manual switch $S_{10}$ which is depressed to purge the turbine, whereby it is possible to purge the turbine by this means only after it is completely shut down, as will also become apparent later. That is, the purge control is deactivated by the application thereto of a positive voltage from the fuel valve control 92 through connection 99 to prevent purging while fuel is being applied to the turbine. The purge control is also deactivated by the application thereto of a positive voltage from the cranking motor control output through connection 254 to prevent purging when the turbine is being cranked automatically during start up, since this represents purging itself. Moreover, the purge control is deactivated during any shutdown procedure by the application thereto of a positive voltage through diode 128, connection 127 and connection 256 to prevent purging at this time. The purge control is reset by pushing the manual stop switch $S_9$ to remove B++ therefrom through connection 245.

To purge the turbine after it is completely shut down, the manual purge switch $S_{10}$ is depressed and held down, which causes the purge control to apply a positive voltage to the relay coil 46 of cranking relay 44 to activate the cranking motor, wherein this positive voltage is applied through the same connection 254 that is used to deactivate the purge control when the cranking motor control is activated. The turning over the turbine by the cranking motor will therefore purge any fuel that remains after running or false startup. Simultaneously, the purge control applies a positive voltage input to the overcrank timer 56 through connection 258 to start the timing circuit therein. The manual purge switch is held depressed until the overcrank timer applies a positive voltage to the overcrank, first out module to cause the light therein to become lit to indicate to the operator that the turbine has been purged for forty seconds. Also, the purge control applies the same positive voltage output to each of the cranking motor control 40, igniter control 78 and fuel valve control 92 through the same connection 256 that is used to deactivate it to deactivate these circuits to prevent initiation of the start up procedure during purging.

A manual start switch $S_8$ is also provided so that the turbine can be manually started through the system, such as in the case of using the turbine for any other purpose. The manual switch $S_8$ is connected between the manual pole of switch $S_2$ and B+ of switch $S_3$ of the reset relay through connection 26. To operate manually, switch $S_2$ is placed in the manual position which, it will be noted, removes any connection to the input of the dropout timer. Instead of the dropout timer applying a signal to the overcrank timer, a direct connection 270 is made between the manual pole of switch $S_2$ and the overcrank timer. Then, the manual start switch is depressed to initiate startup as noted before, with the exception that releasing the manual switch will not initiate shutdown as in the case of the dropout contacts opening, because the dropout timer has been removed from the system. The system will initiate shutdown, however, as a result of any of the aforementioned malfunctions or by means of the manual stop switch $S_9$.

A manually operated lamp test switch $S_{11}$ is also connected between B++ and all of the first out modules through connection 280, so that the operator can depress this switch to test the lamps within these modules. Releasing of this switch also removes power from the lamps.

Figure 2:
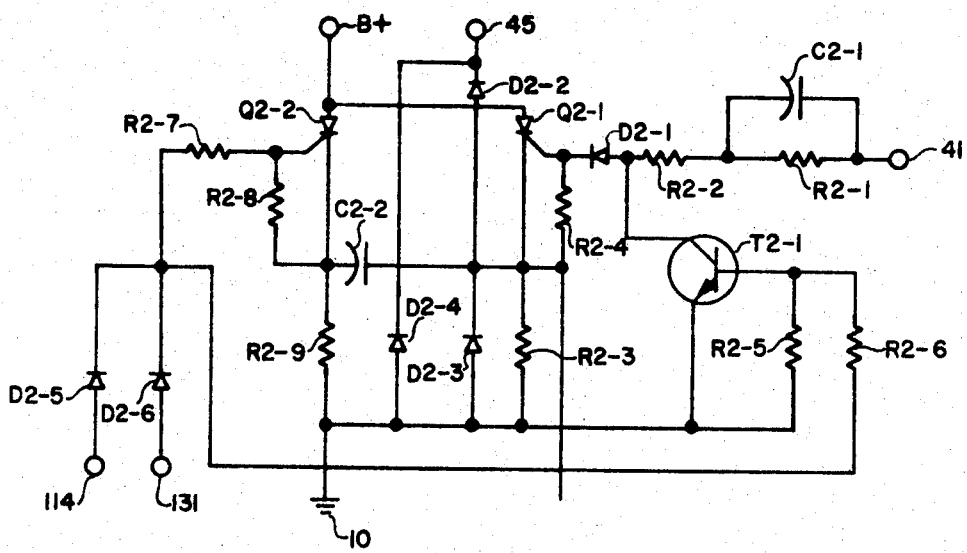

The various circuits used within the system will now be described in detail. Identical circuits are used for each of the cranking motor control 40, igniter control 78 and fuel valve control 92, all as shown in the electrical schematic diagram of FIGURE 2. These modules utilize circuits incorporating controlled rectifiers with various inputs thereto to switch the circuit from one state to the other in response to the various signals from the other parts of the system. Connection 41 represents the input terminal at which the positive voltage input is received from the dropout contacts in the case of the cranking motor control, the positive input voltage from the igniter delay in the case of the igniter control, and the positive voltage input from the fuel delay output in the case of the fuel valve control. Initially, neither of the controlled rectifiers $Q_{2-1}$ and $Q_{2-2}$ of the circuit is conducting, but B+ is connected to the anodes of each so that they will become conductive responsive to flow of gate current in the gate terminal thereof. When a positive voltage is applied to input terminal 41, current will flow to the gate terminal of controlled rectifier $Q_{2-1}$ through resistor $R_{2-1}$, capacitor $C_{2-1}$, resistor $R_{2-2}$ and diode $D_{2-1}$, and biasing resistor $R_{2-4}$, which current causes this controlled rectifier to switch to its low impedance state. Current will flow through load resistor $R_{2-3}$ causing the cathode terminal of this switching device to approach B+ and apply this positive voltage to output connection 45 through diode $D_{2-2}$, the latter being connected at its anode to the cathode terminal of controlled rectifier $Q_{2-1}$. The positive voltage on output terminal 45 will be applied to the cranking relay in the case of the cranking motor control, to the igniter relay in the case of the igniter control, and to the fuel valve solenoid in the case of the fuel valve control.

An npn transistor $T_{2-1}$ is connected at its collector to the anode of diode $D_{2-1}$ and at its emitter to ground potential 10, with the base thereof being connected to the common connections of the cathodes of diode $D_{2-5}$ and $D_{2-6}$ through resistor $R_{2-6}$. A biasing resistor $R_{2-5}$ is connected between the base and emitter of this transistor. A positive voltage applied to input 41 will also be applied to the collector of transistor $T_{2-1}$ to condition it for conduction in the event that a positive voltage is applied to the base thereof. However, in the absence of a positive voltage to either terminals 114 or 131, transistor $T_{2-1}$ will remain in the off condition.

Connection 114 is connected to the high r.p.m. pulse network when used as an igniter control or as a cranking motor control. When used as an igniter control, an input corresponding to connection 41 is received from the igniter control, when used as the fuel valve control, an input is received at 41 from the fuel delay, and when used as a cranking motor control, connection 41 is connected to the drop out contact. A connection corresponding to connection 131 is made to the normal lockout module in all three cases. If a positive voltage is applied to input connection 114 from the high r.p.m. pulse network as described in in connection with FIGURE 1, gate current will flow to the gate terminal of controlled rectifier $Q_{2-2}$ through resistor $R_{2-7}$, and biasing resistor $R_{2-8}$, causing it to switch to its low impedance or conduction state. Current will flow through load resistor $R_{2-9}$ causing the cathode of this switching device to rise in voltage to near B+. A capacitor $C_{2-2}$ is connected between the two cathodes of the controlled rectifiers $Q_{2-1}$ and $Q_{2-2}$, which capacitor differentiates the voltage rise on the cathode of controlled rectifier $Q_{2-2}$ to turn off controlled rectifier $Q_{2-1}$. At the same time, the positive voltage at input connection 114 is applied to the base of transistor $T_{2-1}$ through a resistor $R_{2-6}$, biasing this transistor on. This causes the collector of the transistor, and consequently the anode of diode $D_{2-1}$ to approach ground potential, thus providing a conduction path from input connection 41 to ground. The effect of this is to prevent controlled rectifier $Q_{2-1}$ from turning on again as a result of the positive voltage remaining on input connection 41 by maintaining the gate terminal thereof at ground potential through transistor $T_{2-1}$.

Controlled rectifier $Q_{2-2}$ can also be switched to its low impedance state by the application of a positive voltage to input terminal 131 from any one of the first out modules through diode $D_{2-6}$ in the same manner. Moreover, removal of the positive voltages from the input terminals 114 and 131 will permit transistor $T_{2-1}$ to turn off and controlled rectifier $Q_{2-1}$ to be conditioned to be turned on again in the presence of a positive voltage on its gate. Similarly, capacitor $C_{2-2}$ will differentiate the voltage rise on the cathode of the controlled rectifier $Q_{2-1}$ to turn off controlled rectifier $Q_{2-2}$. To turn off both controlled rectifiers $Q_{2-1}$ and $Q_{2-2}$ so as to reset this circuit, B+ is removed by the actuation of the reset relay as described The output 45 is connected to the purge control 250 and cranking relay 44 in the case of the cranking motor control. A corresponding output is connected to the fuel solenoid in the case of the fuel valve control and the igniter relay in the case of the igniter control. Diodes $D_{2-2}$, $D_{2-3}$ and $D_{2-4}$ provide necessary isolation between connection 45 and ground or the cathode of device $Q_{2-1}$.

Figure 3:
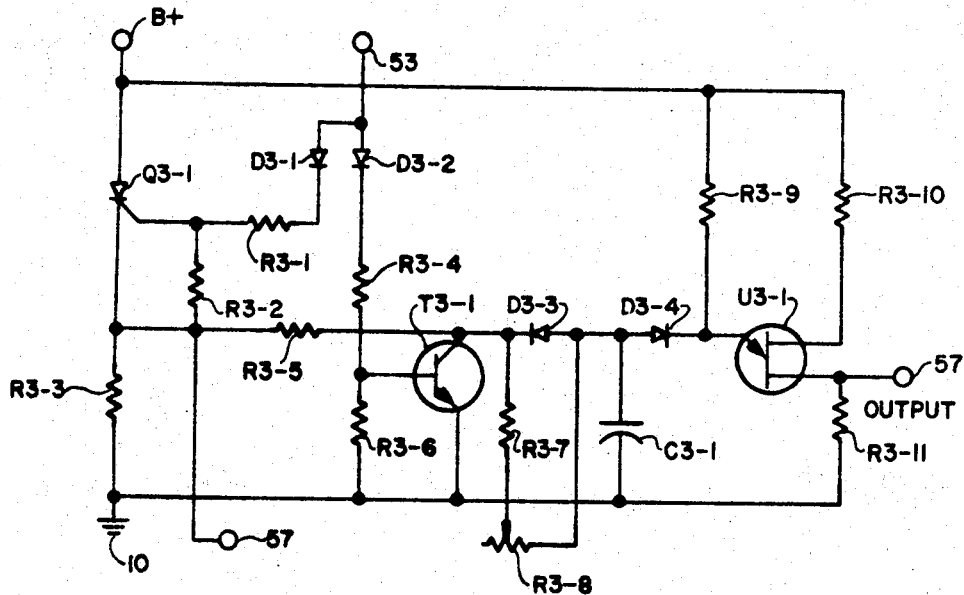
FIGURE 3 is an electrical schematic diagram of a dropout timer circuit used in the system for operating in response to the resumption of power of a primary power source to initiate shutdown of the turbine should the primary power continue after resumption for a predetermined period of time.

In the electrical schematic diagram of the dropout timer 52 shown in FIGURE 3, the input connection 53, to which the dropout signal voltage input is applied, is connected to the common connection of the anodes of two blocking diodes $D_{3-1}$ and $D_{3-2}$. The cathode of diode $D_{3-1}$ is connected to the gate terminal of a controlled rectifier $Q_{3-1}$ through resistor $R_{3-1}$. The anode terminal of the rectifier is connected to B+, the cathode thereof is connected to ground potential 10 through resistor $R_{3-3}$ and a biasing resistor $R_{3-2}$ is connected between the gate and the cathode thereof. An output connection 57 is derived from the cathode of the controlled rectifier and is applied to the input of the overcrank timer. Upon the application of a positive voltage to input connection 53, diode $D_{3-1}$ will conduct and apply gate current to the gate of the controlled rectifier to cause it to switch to its low impedance state. This causes the cathode of the rectifier to rise in voltage and apply a positive voltage to the input of the overcrank timer through output connection 57.

A transistor $T_{3-1}$ is connected at its collector to the cathode of the controlled rectifier through resistor $R_{3-5}$ and at its emitter to ground potential 10. The cathode of the other blocking diode $D_{3-2}$ is connected to the base of the transistor through resistor $R_{3-4}$, with a biasing resistor $R_{3-6}$ being connected between the base of the transistor and ground potential. Upon the application of the positive voltage to the input connection 53, $D_{3-2}$ also conducts and applies a positive voltage to the base of the transistor. As a result of the controlled rectifier switching to its low impedance state, the collector of the transistor is also made positive, biasing the transistor for conduction causing the collector thereof to subsequently drop in voltage to very nearly ground potential.

Also connected to the cathode of the controlled rectifier through resistor $R_{3-5}$, resistor $R_{3-7}$ and adjustment resistor $R_{3-8}$ is a capacitor $C_{3-1}$, with the other terminal of the capacitor being connected to ground, wherein this capacitor and resistors $R_{3-5}$, $R_{3-7}$ and $R_{3-8}$ establish the time constant of the timing circuit of the dropout timer.

The time constant of the circuit is determined by the values of the resistors and capacitor and can be varied by varying the adjustment resistor $R_{3-8}$. Also connected to B+ through resistor $R_{3-10}$ is one of the base terminals of a unijunction transistor $U_{3-1}$, with the other base terminal thereof being connected to ground potential through resistor $R_{3-11}$. The emitter terminal of the unijunction transistor is connected to the cathode of an isolation diode $D_{3-4}$, with the anode of this diode being connected to capacitor $C_{3-1}$. A biasing resistor $R_{3-9}$ is also connected between B+ and the emitter of the unijunction transistor.

One function of the dropout timer circuit is to apply a positive voltage to the overcrank timer upon a positive voltage being applied to input connection 53. This, as previously noted, results from controlled rectifier $Q_{3-1}$ switching to the low impedance state, causing the cathode thereof to rise in voltage. At the same time, the collector transistor $T_{3-1}$ is made positive and a positive voltage is applied to the base thereof through diode $D_{3-2}$, thus causing transistor $T_{3-1}$ to conduct and the collector thereof to drop in potential.

The switching of the controlled rectifier to the low impedance state sets the timing circuit insofar as providing a positive voltage toward which capacitor $C_{3-1}$ can charge at the proper time. The provision of transistor $T_{3-1}$ shunts this capacitor when the transistor is conducting, thus preventing the timing circuit from charging until such time that the dropout signal input voltage is removed from connection 53. Upon this occurrence, transistor $T_{3-1}$ is turned off because of the removal of the voltage from the base thereof, and capacitor $C_{3-1}$ starts charging toward B+ through resistor $R_{3-8}$, resistor $R_{3-7}$ and resistor $R_{3-5}$. Therefore, this timing circuit does not operate until normal power is returned, which is the desired function of the circuit, as previously stated.

The time constant of the circuit is set at about two minutes to insure that the primary power stays on for a sufficient length of time. After the capacitor is charged for this period of time, the voltage thereon applied to the emitter of unijunction transistor $U_{3-1}$ through diode $D_{3-4}$ will cause the unijunction transistor $U_{3-1}$ to switch and discharge capacitor $C_{3-1}$ through its base-emitter circuit. This results in a rise of voltage on output connection 121 connected to the base terminal of the unijunction transistor and consequently the application to the input of the normal lockout of a positive voltage, all of which will initiate shutdown of the turbine.

Another blocking diode $D_{3-3}$ is connected at its anode to capacitor $C_{3-1}$ and at its cathode to the collector of transistor $T_{3-1}$ for the purpose of discharging capacitor $C_{3-1}$ should the dropout signal input voltage be removed from connection 53 and reapplied thereto before the expiration of the two minutes of timing circuit time constant. In this event, the voltage on capacitor $C_{3-1}$ will be higher than that on the collector of the transistor $T_{3-1}$, thus causing diode $D_{3-3}$ to conduct and the capacitor to discharge through transistor $T_{3-1}$. This, it is apparent, resets the timing circuit so that a full two minutes will be required for the capacitor $C_{3-1}$ to charge the next time. It will be apparent that once the controlled rectifier $Q_{3-1}$ is switched to its low impedance state, it will continue to conduct regardless of the removal of the dropout signal input. Thus an output voltage is continually applied to the input of the overcrank timer through connection 57. The controlled rectifier $Q_{3-1}$ is reset to its non-conduction state by removing B+ from the anode when the reset relay is actuated.

Figure 4:
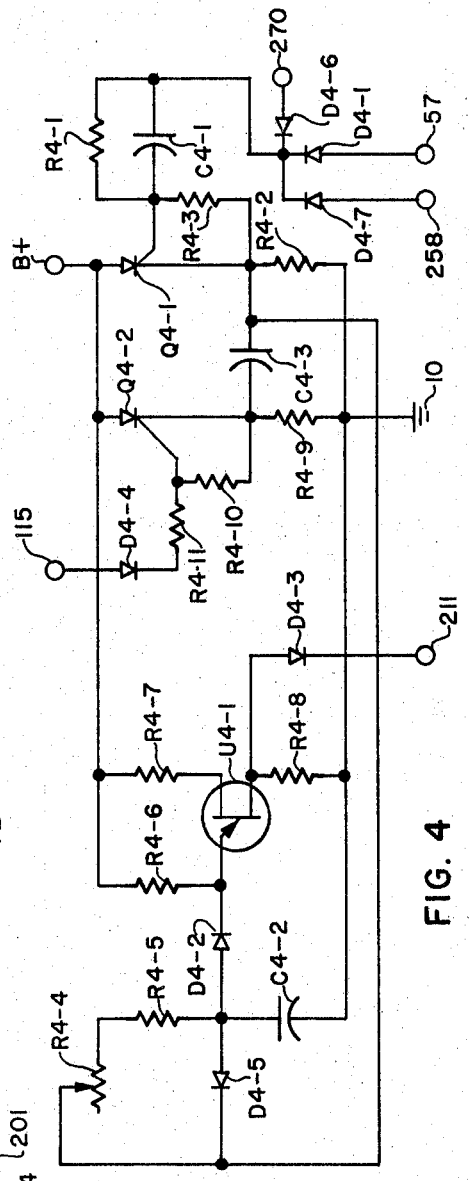
FIGURE 4 is an electrical schematic diagram of an overcrank timer which will initiate shutdown of the turbine should the turbine have to be cranked during the starting sequence for too long a period of time, indicating a malfunction in operation of the turbine.

An electrical schematic diagram of the overcrank timer is shown in FIGURE 4, wherein it will be recalled that the function of the overcrank timer is to insure that the cranking control does not operate the cranking motor for more than a preset period of time, normally about forty seconds. The overcrank timer is made operative by the application to an input thereof from the dropout timer of a positive voltage, which positive voltage is derived through the dropout timer as a result of the dropout contacts closing. Thus the overcrank timer will continue to operate even when the dropout contacts subsequently open, since the controlled rectifier $Q_{3-1}$ in the dropout timer remains conductive once it is switched to its low impedance state until B+ is removed. Should the cranking of the turbine persist for more than forty seconds, the overcrank timer will generate positive output voltage to the input of the overcrank, first out module to initiate shutdown of the turbine. This will occur only if the turbine is not running at a speed of 12,000 r.p.m. within the forty second period. On the other hand, if the turbine reaches a speed of 12,000 r.p.m. within this time period, which it will do under normal operation, a positive input voltage will be applied to the overcrank timer from the high r.p.m. pulse network to shut down the timing circuit within the overcrank timer, which also resets the timer.

As shown in FIGURE 4, an input is applied from the dropout timer through connection 57 to the anode of diode $D_{4-1}$, which diode is connected at its cathode to the gate of controlled rectifier $Q_{4-1}$ through capacitor $C_{4-1}$. This capacitor, along with the parallel resistor $R_{4-1}$, acts as a bias to the gate of the controlled rectifier, whereas another biasing resistor $R_{4-3}$ is connected between the gate and the cathode of the controlled rectifier. This controlled rectifier is connected at its anode to B+ and at its cathode to ground potential 10 through a load resistor $R_{4-2}$. Upon the application of a positive voltage to the input 57, controlled rectifier $Q_{4-1}$ will switch to its low impedance state, causing the cathode thereof to rise in potential toward B+. Connected between the cathode of the controlled rectifier $Q_{4-1}$ and one terminal of a charging capacitor $C_{4-2}$ are an adjustment resistor $R_{4-4}$ and another resistor $D_{4-5}$, wherein the other terminal of the charging capacitor is connected to ground potential 10. A blocking diode $D_{4-2}$ is connected at its anode to the positive terminal of capacitor $C_{4-2}$ and connected at its cathode to the emitter of a unijunction transistor $U_{4-1}$. The base terminal of the unijunction transistor is connected to B+ through resistor $R_{4-7}$, and the other base terminal is connected to ground potential 10 through resistor $R_{4-8}$. A biasing resistor $R_{4-6}$ is connected between B+ and the emitter thereof. Another blocking diode $D_{4-3}$ is connected to the low potential base terminal of the unijunction transistor at its anode and at the cathode thereof to output connection 211 applied to the overcrank, first out module.

When controlled rectifier $Q_{4-1}$ is caused to switch to its low impedance state, the positive voltage established at the cathode thereof will be applied to capacitor $C_{4-2}$ through the charging resistors $R_{4-4}$ and $R_{4-5}$, causing this capacitor to charge. In other words, the timing circuit within the overcrank timer is started as a result of the positive voltage input to terminal 57 from the dropout timer, and as noted earlier, the time constant is about forty seconds. Assuming that the turbine does not reach a speed of 12,000 r.p.m. within this forty second interval, no positive voltage will be applied from the high r.p.m. pulse network to connection 115, and the voltage on the capacitor will then attain a value sufficient to cause breakdown of the unijunction transistor $U_{4-1}$, thus discharging the capacitor. When this occurs, the terminal of the unijunction transistor, to which is connected the anode of diode $D_{4-3}$, will rise in potential toward B+ and generate a positive voltage output on connection 211 applied to the input of the overcrank, first out module. This, as noted earlier, will initiate shutdown of the turbine.

Assuming that the turbine does reach a speed of 12,000 r.p.m. before the expiration of the forty second time interval, a positive voltage will be applied from the high r.p.m. pulse network to the anode of diode $D_{4-4}$ through connection 115, which diode is connected to the gate of controlled rectifier $Q_{4-2}$ through resistor $R_{4-11}$. This controlled rectifier is connected at its anode to B+ and at its cathode to ground potential 10 through load resistor $R_{4-9}$, with a biasing resistor $R_{4-10}$ being connected between the gate and cathode. Thus the positive voltage connection 115 will cause controlled rectifier $Q_{4-2}$ to switch to its low impedance state which, in turn, causes the cathode thereof to rise in potential toward B+. A capacitor $C_{4-3}$ is connected between the cathodes of the two controlled rectifiers, which capacitor differentiates the voltage rise on the cathode of controlled rectifier $Q_{4-2}$ and turns off controlled rectifier $Q_{4-1}$. After controlled rectifier $Q_{4-1}$ is turned off, its cathode will be at ground potential. Another diode $D_{4-5}$ is connected at its cathode to the cathode of controlled rectifier $Q_{4-1}$ and at its anode to the high voltage side of capacitor $C_{4-2}$. Upon the turning off of controlled rectifier $Q_{4-1}$, capacitor $C_{4-2}$ will have a positive voltage thereacross, and due to the fact that ground potential is applied to the cathode of isolation diode $D_{4-5}$ from the cathode of controlled rectifier $Q_{4-1}$, capacitor $C_{4-2}$ will be discharged through this isolation diode to ground, thus resetting the timing circuit. The controlled rectifiers are reset by the removal of B+ from the anodes thereof when the reset relay is actuated.

Another input diode $D_{4-6}$ is connected commonly at its cathode to the other input diode $D_{4-1}$ so that the overcrank timer can be activated by the closing of the manual start switch through connection 270. Similarly, another input diode $D_{4-7}$ is provided to activate the overcrank timer through connection 258 from the purge control.

An electrical schematic diagram of the speed switch is shown in FIG. 5, wherein the input voltage is applied to connection 61 from the speed transducer 60. As will be recalled from the discussion above, the speed transducer produces or generates the same prescribed number of pulses for each revolution of the turbine shaft, and in one particular case of a magnetic reluctance pickup, three positive voltage pulses are generated at input connection 61 for each revolution of the turbine shaft. The input connection 61 is applied to the base of a transistor $T_{5-1}$ through resistor $R_{5-1}$, wherein the collector of the transistor is connected to B+ through load resistor $R_{5-2}$ and the emitter of the transistor is connected to ground 10. A diode $D_{5-1}$ is connected between the input 61 and ground to prevent the base of the transistor from going below ground potential should the transducer output do so. The collector of this transistor is connected to the base of another transistor $T_{5-2}$ through resistor $R_{5-3}$, with the base of this transistor being connected to ground through resistor $R_{5-4}$, its emitter to ground and the collector to B+ through resistor $R_{5-5}$. The collector of this transistor is connected to the base of another similarly connected transistor $T_{5-3}$ through the parallel connection of resistor $R_{5-6}$ and capacitor $C_{5-1}$, with the base of this transistor being connected to ground through resistor $R_{5-7}$ and the collector to B+ through load resistor $R_{5-8}$. The collector of this transistor is connected to the base of another similarly connected transistor $T_{5-4}$ through resistor $R_{5-9}$, with the base of the latter transistor being connected to ground through resistor $R_{5-10}$ and the collector thereof being connected to B+ through load resistor $R_{5-11}$. The collector of this transistor is now connected to the emitter of a unijunction transistor $U_{5-1}$, wherein the emitter of the latter is also connected to ground through a charging capacitor $C_{5-3}$, and the two base terminals are connected to B+ and ground, respectively. The collector of transistor $T_{5-4}$ is also connected to the base of another similarly connected transistor $T_{5-5}$ through the parallel connection of capacitor $C_{5-2}$ and resistor $R_{5-12}$, with the base of the latter transistor being connected to ground through resistor $R_{5-13}$ and the collector thereof being connected to B+ through load resistor $R_{5-14}$. The collector of this transistor is connected to the base of a transistor $T_{5-6}$ through the parallel connection of resistor $R_{5-15}$ and capacitor $C_{5-4}$, the emitter of the latter transistor being connected to B+ and the collector being connected to ground through resistor $R_{5-16}$. Finally, an output of the speed switch is derived from the collector of transistor $T_{5-6}$ through resistor $R_{5-17}$ to output connection 67, with a Zener diode $Z_{5-1}$ being connected between the output 67 and ground potential 10.

Upon the application to input 61 of a positive voltage, transistor $T_{5-1}$ will be turned on, transistor $T_{5-2}$ will be turned off, transistor $T_{5-3}$ will be turned on, and transistor $T_{5-4}$ will be turned off. The first three transistors function to shape the pulse produced by the speed transducer pickup to produce a square wave at the collector of the third transistor. This fourth transistor, $T_{5-4}$, will be turned off each time a pulse from the speed transducer is applied to the base of the first transistor. When transistor $T_{5-4}$ is turned off, its collector will be approximately at B+ potential, and charging capacitor $C_{5-3}$ will start charging toward this potential through load resistor $R_{5-11}$. When this charging capacitor has attained a voltage of sufficient value as determined by the time constant of resistor $R_{5-11}$ and the capacitor, the unijunction transistor $U_{5-1}$ will conduct and discharge the capacitor. Simultaneous with the initiation of the charging of capacitor $C_{5-3}$, which occurs when transistor $T_{5-4}$ is turned off, the voltage on the collector of this transistor will be applied to the base of transistor $T_{5-5}$ causing it to conduct. This transistor will conduct until the unijunction transistor is made to conduct, at which time it will be turned off as a result of the capacitor $C_{5-3}$ discharging and applying ground potential on the base thereof through resistor $R_{5-12}$. Thus it will become apparent that the turning on of transistor $T_{5-5}$ is governed by the turning on of transistor $T_{5-4}$, but that the turning off of transistor $T_{5-5}$ is determined by the time constant of resistor $R_{5-11}$ and capacitor $C_{5-3}$ and the cooperation of unijunction $U_{5-1}$. It will be apparent then, that regardless of the width of the voltage pulses from the speed transducer applied to input 61, the width of the pulse generated at the collector of transistor $T_{5-5}$ will be extremely constant. It will also be apparent that the time between the pulses applied to input 61 must be longer than the time constant of the timing circuit previously mentioned.

The output derived from the collector of transistor $T_{5-5}$ is applied through the transistor $T_{5-6}$, which is connected as a collector follower, for impedance matching purposes, wherein the output is derived from the collector of transistor $T_{5-6}$ through transistor $R_{5-17}$. The Zener diode $Z_{5-1}$ connected between the output connection 67 and ground potential clips the voltage pulses generated at the output at a very constant level. Since these pulses are already of extremely constant width, the area beneath the pulses, or the energy contained therein, is extremely uniform. This is so even though the supply voltage, speed of the turbine and ambient temperature may vary over reasonably wide ranges. Insofar as any temperature variations, the height of the pulses will vary therewith to some degree, but because temperature changes affect the unijunction transistor $U_{5-1}$ and Zener diode $Z_{5-1}$ in opposite ways (meaning that if the unijunction transistor breaks down at a lower voltage, the Zener diode will break down at a corresponding higher voltage, and vice versa), the area of the output pulses will still remain extremely constant even though a pulse may simultaneously become more narrow and higher or, alternatively, wider and shorter.

Thus it can be seen that the constant energy output pulse circuit results in large part from the cooperation between the unijunction transistor $U_{5-1}$ and Zener diode $Z_{5-1}$, and certainly, the temperature compensating effects of this circuit result from the cooperation between these two devices. The result is to provide to the input of the tachometer and meter relay constant energy pulses, the number of which per unit of time represents the speed of the turbine. These pulses can therefore be integrated by the tachometer and meter relay to generate output pulses to other parts of the system which will be extremely accurate indications of predetermined speeds of the turbine.

Figure 6:
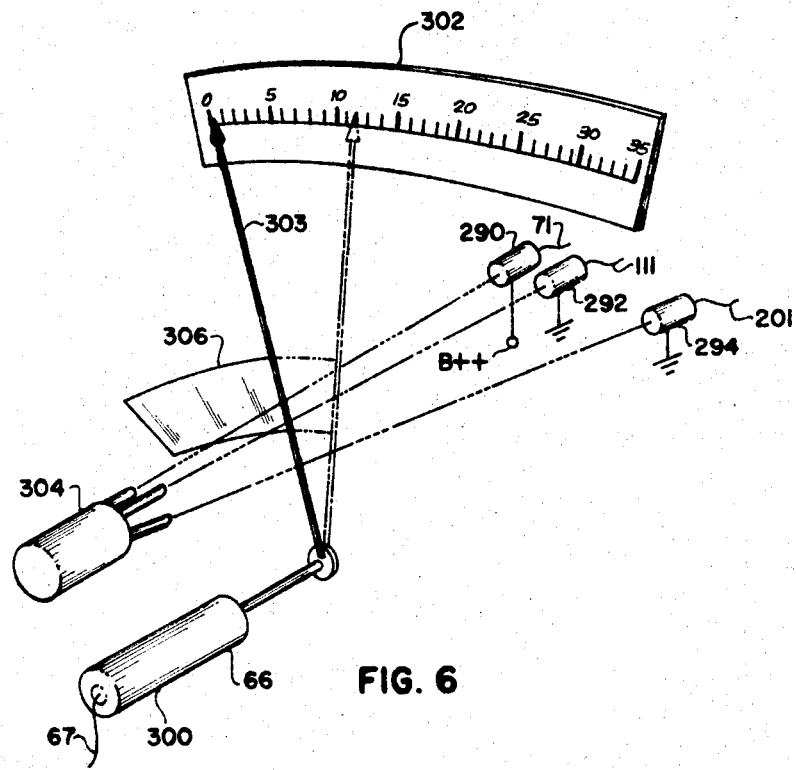
FIGURE 6 is a schematic diagram of a tachometer and meter relay which operate in response to the output of the speed switch and which generate output signals when the speed of the turbine attains predetermined levels.

The tachometer and meter relay 66 is shown schematically in FIGURE 6, wherein a tachometer 300 of conventional design integrates the energy of the voltage pulses from connection 67 and has a scale 302 and a needle 303 driven by the tachometer to indicate speed. One or more light sources 304 are provided in the tachometer which directs light on three light sensitive resistance devices 290, 292 and 294, such as photoresistors, for example. When the turbine attains a speed of 3,000 r.p.m., the element 306 interrupts the light impinging on device 290, thus causing its resistance to increase and the voltage at output connection 71 applied to the low r.p.m. pulse network to decrease. This decrease in voltage is the signal for actuating the pulse network, wherein this decreased voltage remains at output 71 for all speeds of the turbine in excess of 3,000 r.p.m. Similarly, the light impinging on devices 292 and 294 is interrupted at speeds of 12,000 r.p.m. and 31,200 r.p.m., respectively, to decrease the voltage at outputs 111 and 201 applied to the two inputs of the high r.p.m. pulse network. A more detailed description of the tachometer and meter relay 66 will not be given as such devices are well known. It will be appreciated, however, that individual meter relays can be used for each speed threshold.

Figure 7:
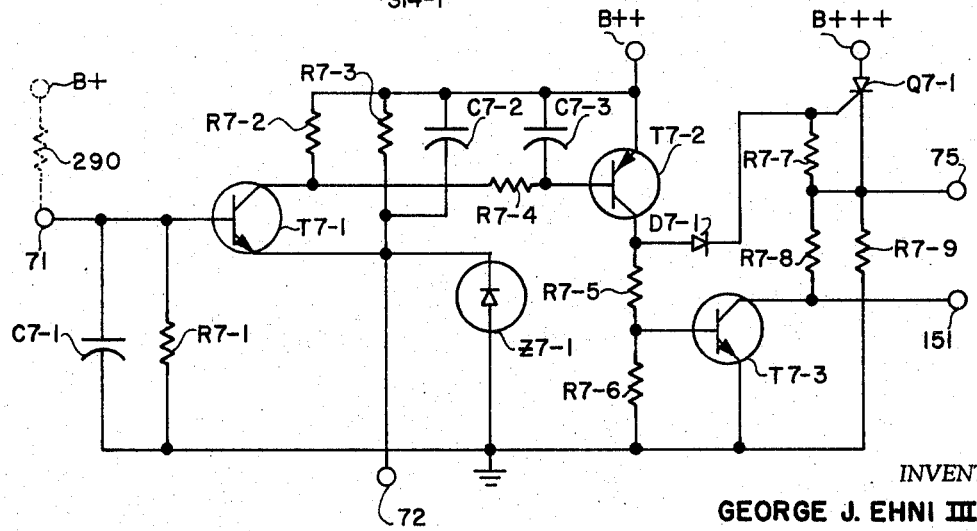
FIGURE 7 is an electrical schematic diagram of a low r.p.m. pulse network which operates in response to the signal from a tachometer and meter relay generated at a predetermined minimum speed of the turbine, which network initiates combustion in the turbine in response thereto.

An electrical schematic diagram of the low r.p.m. pulse network is shown in FIGURE 7, wherein the output from the low r.p.m. portion of the meter tachometer and meter relay is applied to input connection 71 connected to the base of transistor $T_{7-1}$. As noted previously, light sensitive device 290 in the low r.p.m. portion of the meter relay is connected between the base of this transistor through connection 71 and B+, and when the needle on the tachometer interrupts the light beam at 3,000 r.p.m., causing the resistance of device 290 to increase, the voltage on the base of transistor $T_{7-1}$ is decreased to turn it off. Suitable biasing impedance comprised of the parallel connection of capacitor $C_{7-1}$ and resistor $R_{7-1}$ are also connected between the base of transistor $T_{7-1}$ and ground potential 10 to form the biasing network with device 290. Transistor $T_{7-1}$ is connected at its collector to B++ through load resistor $R_{7-1}$ and at its emitter to ground potental through Zener diode $Z_{7-1}$. The cathode of the Zener diode is also connected to B++ through the parallel connection of resistor $R_{7-3}$ and capacitor $C_{7-2}$, which establishes a voltage across the Zener sufficient to cause breakdown thereof to maintain the emitter of transistor $T_{7-1}$ at a constant voltage regardless of fluctuations in the supply potential. A connection 72 is also made between the emitter of transistor $T_{7-1}$ and the emitters of the two input transistors of the high r.p.m. pulse network, as will be described later, so that the Zener diode $Z_{7-1}$ can serve the purpose of maintaining all of these emitters at the same constant potential. The result of this is to insure that the input ransistors are turned off when the input signal is applied by stabilizing the biasing point thereof. The collector of transistor $T_{7-1}$ is connected to the base of a transistor $T_{7-2}$ through resistor $R_{7-4}$, with the emitter of the latter transistor being connected to B++ and a base being connected to B++ through capacitor $C_{7-3}$. The collector of this transistor is connected to ground potential through the voltage dividing series of resistors $R_{7-5}$ and $R_{7-6}$. The collector of transistor $T_{7-2}$ is also connected to the gate of a controlled rectifier $Q_{7-1}$ through diode $D_{7-1}$, with the anode of the rectifier being connected to B+++ and the cathode being connected to ground potential through load resistor $R_{7-9}$. A biasing resistor $R_{7-7}$ is connected between the gate electrode and cathode of silicon controlled rectifier $Q_{7-1}$. Another transistor $T_{7-3}$ is connected at its base to the interconnection of resistors $R_{7-5}$ and $R_{7-6}$, at its emitter to ground and at its collector to the cathode of the controlled rectifier through resistor $R_{7-8}$. A first output is derived from the low r.p.m. pulse network at connection 75 to the cathode of the controlled rectifier, and a second output is derived through connection 151 to the collector of transistor $T_{7-3}$. The first output is applied to the input of the igniter delay 74, and the second output is applied to the input of the coastdown lockout 126.

When the turbine reaches 3,000 r.p.m. and the voltage on the base of transistor $T_{7-1}$ is lowered, this transistor is cut off, thus raising the voltage on its collector and causing the voltage on the collector of transistor $T_{7-2}$ to rise accordingly. The collector voltage increase on transistor $T_{7-2}$ is applied to the gate of the controlled rectifier through diode $D_{7-1}$ and causes it to switch to its low impedance state. Upon this occurrence, the cathode of the controlled rectifier approaches B+++, and substantially 24 volts is applied to the first output through connection 75. Also upon the switching of the controlled rectifier to its low impedance state, a positive voltage is applied to the collector of transistor $T_{7-3}$ from the cathode of the controlled rectifier, in addition to a positive biasing voltage applied to the base of this transistor from the collector of transistor $T_{7-2}$. This causes the transistor $T_{7-3}$ to conduct to lower the potential at the collector thereof to approximately ground potential. Thus it can be seen that at speeds of the turbine above 3,000 r.p.m., there will be approximately +24 volts at one output through connection 75 and ground potential at the second output through connection 151. When the speed of the turbine decreases below 3,000 r.p.m., such as in the case of shutdown, transistor $T_{7-1}$ will again conduct causing the collector voltage of transistor $T_{7-2}$ to drop. This causes transistor $T_{7-3}$ to cut off and the voltage on the second output to increase to approximately 24 volts because of its connection to the cathode of the controlled rectifier through resistor $R_{7-8}$. It is apparent also that the controlled rectifier continues to conduct in its low impedance state upon this occurrence. Thus upon a speed above 3,000 r.p.m. being attained, a positive voltage appears at connection 75 that remains until shutdown. This voltage is applied through connection 75 to the input of igniter delay to actuate this circuit. If the speed is below 3,000 r.p.m, +24 volts is applied through connection 151 to the coastdown lockout initiating the charging of the timing circuit therein. As discussed previously in connection with FIGURE 1, the coastdown lockout will, after approximately forty seconds after activation of the timing circuit, actuate the reset relay 20 to remove B+ and B+++ from all of the systems. Upon this occurrence, it will be seen that the B+++ is removed from the anode of the controlled rectifier $Q_{7-1}$, which will remove the voltage from both outputs, cause the controlled rectifier to crease conduction and reset the system.

Figure 8:
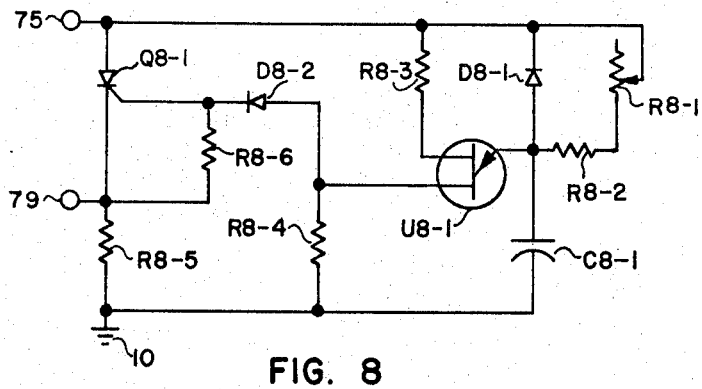
FIGURE 8 is an electrical schematic diagram of an igniter delay which operates in response to an output signal from the low r.p.m. pulse network and causes the operation of the igniter to be delayed by a predetermined period of time after the turbine has reached the above mentioned predetermined minimum speed.

An electrical schematic diagram of the igniter delay is shown in FIGURE 8, wherein the positive output voltage from the low r.p.m. pulse network is applied to the input thereof through connection 75 to an R-C charging network comprising adjustable resistor $R_{8-1}$, resistor $R_{8-2}$ and capacitor $C_{8-1}$, the latter of which is connected to ground potential 10. Resistor $R_{8-1}$ is variable to adjust the time constant of this circuit. The other side of capacitor $C_{8-1}$ is also connected to the emitter of a unijunction transistor $U_{8-1}$, the latter of which is connected at one base terminal to the input connection 75 through resistor $R_{8-3}$ and at the other base terminal to ground potential through resistor $R_{8-4}$. The latter terminal of the unijunction transistor is also connected to the gate of a controlled rectifier $Q_{8-1}$ through diode $D_{8-2}$, wherein the anode of the controlled rectifier is also connected to input connection 75 and the cathode thereof is connected to ground potential through load resistor $R_{8-5}$. A biasing resistor $R_{8-6}$ is connected between the gate of the controlled rectifier and the cathode thereof. An output is derived from the cathode of the controlled rectifier through connection 79, which output is applied to the input of the igniter control 78. It will be seen that the entire circuit is powered from the input connection 75 and made operative thereby. Upon the application of a positive voltage to the input connection, capacitor $C_{8-1}$ starts to charge and attains a voltage sufficient to turn on unijunction transistor $U_{8-1}$ in a time determined by the time constant of the charging circuit. When the unijunction transistor is turned on, it discharges capacitor $C_{8-1}$ and causes the base terminal of the unijunction transistor connected to the gate of the controlled rectifier to rise in potential permitting gate current to flow and switch the controlled rectifier to its low impedance state. Upon this occurrence, the cathode of the controlled rectifier rises in potential and applies an output voltage to the input of the igniter control. As was noted earlier, the purpose in the delay of the switching of the controlled rectifier to its low impedance state is to prevent undesirable preignition of the turbine. It will be noted that since the controlled rectifier is powered from the input connection 75, the igniter delay cannot produce an output pulse unless the turbine is running at a speed in excess of 3,000 r.p.m. In other words, it is not powered from any of B+, B++ or B+++. In the event that the turbine does not maintain a speed of at least 3,000 r.p.m. for the length of time required to cause the unijunction transistor to conduct, the positive voltage will be removed from the input connection 75, which will then be at approximately ground potential, thus forward biasing diode $D_{8-1}$ connected between the emitter of the unijunction transistor and the input connection. This will allow the capacitor $C_{8-1}$ to discharge, thus resetting the circuit. The removal of the positive input voltage will reset the controlled rectifier by switching it to its high impedance state.

Figure 9:
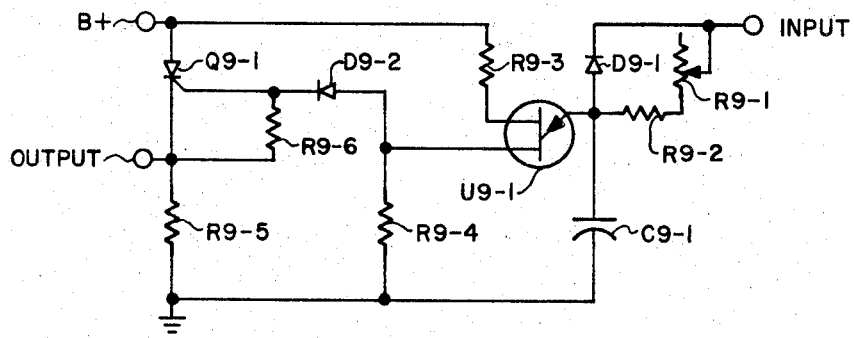
FIGURE 9 is an electrical schematic diagram of another of another time delay circuit used in the system, wherein the circuit shown in this figure is used in each of the fuel delay, ignition failure delay and high exhaust delay circuits of the system.

A circuit identical to the igniter delay is used for each of the fuel delay circuit 88, the ignition failure delay circuit 98 and the high exhaust delay circuit 88, the ignition failure delay circuit 98 and the high exhaust delay circuit 188, with the exception that the silicon controlled rectifier and unijunction transistor of these circuits are powered from B+ rather than from the inputs thereof, there being no connection between resistor $R_{9-3}$ and diode $D_{9-1}$. These circuits are shown in the electrical schematic diagram of FIGURE 9. The operation of the circuit is essentially the same as previously described with reference to FIGURE 8, except the numerals 9 take the place of numerals 8 in FIGURE 8. In each of these three circuits, it is desired that the controlled rectifier, once it is switched to its low impedance state, stay in that condition unless B+ is removed from the system through the reset relay 20. Also as previously noted, positive output voltage is applied to the fuel valve control 92 in response to a positive voltage input from the igniter control after a lapse of a preset time as determined by the time constant of the charging circuit within this circuit. Similarly, a positive output voltage is applied to the pyrometer control 106 in response to a positive voltage input from the fuel valve control after this set period of time, and a positive voltage output is applied to the input of the high exhaust temperature, first out module 194 in response to a positive voltage input from the pyrometer control 106.

Figure 10:
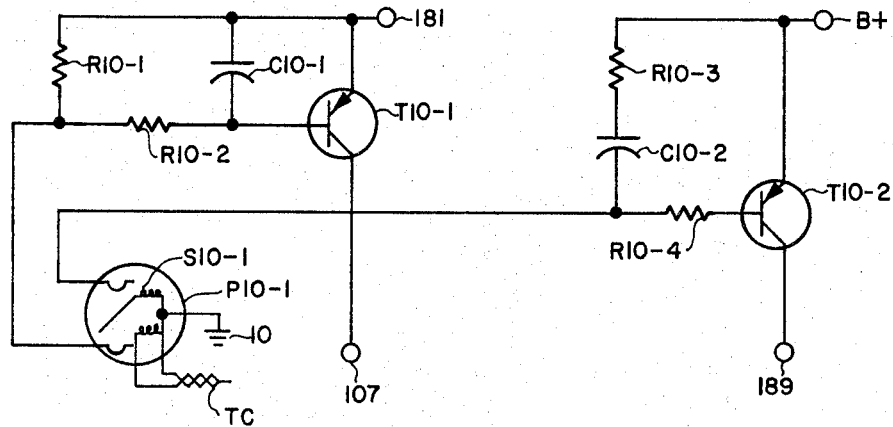
FIGURE 10 is an electrical schematic diagram of a pyrometer control, additionally showing a schematic diagram of a pyrometer connected thereto, for monitoring the temperature of the turbine exhaust and for generating signals to initiate shutdown of the turbine should the exhaust temperature be either too low or too high.

The pyrometer control module is shown in the electrical schematic diagram of FIGURE 10, wherein a pyrometer $P_{10-1}$ is used to measure the exhaust temperature of the turbine and generate output signals in response thereto. The pyrometer comprises a thermocouple TC which detects the exhaust temperature and generates a voltage proportional thereto, which voltage is applied to a switch $S_{10-1}$ within the pyrometer. As described earlier, the pyrometer control does not function unless the temperature of the turbine exhaust is either below a minimum or above a maximum. The switch within the pyrometer is proportional in that it will close against a low contact if the temperature is too low and will close against a high contact if the temperature is too high. This switch contact is connected to ground potential 10 so that ground potential will be applied to the low and high poles of the switch if the switch contact comes in contact therewith. The low pole is connected to the base of a transistor $T_{10-1}$ through resistor $R_{10-2}$, which transistor is connected at its emitter to the input connection 107 from the ignition delay output and connected at its collector to output connection 181 applied to the input of the ignition failure, first out module 180. Suitable biasing resistor $R_{10-1}$ and capacitor $C_{10-1}$ are used as shown. Upon the generation of the positive voltage output from the ignition delay applied to connection 107, transistor $T_{10-1}$ is made operative in that a supply potential is provided to the emitter thereof. It will be recalled that the ignition failure delay will apply a positive voltage on connection 107 only after the fuel valve control has been actuated and then only after a delay as determined by the time constant of the charging circuit within the ignition failure delay. This will therefore prevent an erroneous indication of too low an exhaust temperature. However, once transistor $T_{10-1}$ has been activated in that a supply potential is provided and the exhaust temperature of the turbine is determined to be too low, switch $S_{10-1}$ will engage the low contact and the latter will apply ground potential to the base of transistor $T_{10-1}$, therefore turning it on. This will cause the emitter to rise in voltage and apply a positive voltage to the input of the ignition failure, first out module 180 through connection 181. Another transistor $T_{10-2}$ is connected at its emitter to B+ and at its collector to output connection 189 applied to the input of a high exhaust delay 188. The transistor is biased between B+ and its base by resistor $R_{10-3}$, capacitor $C_{10-2}$ and resistor $R_{10-4}$. The high pole of the pyrometer is connected to the base of this transistor through resistor $R_{10-4}$. In the event that the exhaust temperature of the turbine ever exceeds a predetermined maximum value, the contact of switch $S_{10-1}$ will engage the high pole, the latter of which will apply ground potential to the base of transistor $T_{10-2}$, thereby biasing it on. Consequently, the emitter of the transistor will rise in voltage and apply a positive voltage to the input of the high exhaust delay 188. It will be apparent from the circuit that a voltage is produced at output 181 to the ignition failure, first out module only upon the concurrent application to transistor $T_{10-1}$ of a signal from both the pyrometer and the ignition failure delay, whereas a voltage is produced at output 189 to the high exhaust delay on the application of a signal to transistor $T_{10-2}$ from the pyrometer only. It will also be apparent that when the exhaust temperature is in the proper range, the contact of switch $S_{10-1}$ in the pyrometer will engage neither pole, and no signal will be produced by the pyrometer control.

An electrical schematic diagram of the high r.p.m. pulse network is shown in FIGURE 11. As discussed earlier in connection with the tachometer and meter relay 66, the light sensitive device 292 therein that increases in resistance upon the turbine attaining a speed of 12,000 r.p.m. is connected through connection 111 to the base of transistor $T_{11-1}$, with a capacitor being connected between this base and ground. The base is also connected to B++ through resistor $R_{11-1}$ to complete the biasing circuit of the transistor $T_{11-1}$. The collector of this transistor is connected to B+ through resistor $R_{11-2}$ with the emitter thereof being connected commonly to the emitter of transistor $T_{7-1}$ of the low r.p.m. pulse network through connection 72. It will be remembered that the voltage on this emitter is maintained constant by virtue of the Zener diode $Z_{7-1}$ connected thereto. Because of the biasing of this transistor, it is conducting in the absence of a signal applied to the input connection 111, but upon the turbine attaining a speed of 12,000 r.p.m., the voltage on the base of this transistor is caused to decrease, thus turning this transistor off. The collector of this transistor is connected to the base of a transistor $T_{11-2}$ through resistor $R_{11-3}$, with a capacitor $C_{11-2}$ connected between the base of the latter transistor and B+. The emitter of transistor $T_{11-2}$ is connected to B+ with the collector thereof being connected to the gate of a controlled rectifier $Q_{11-1}$ through resistor $R_{11-4}$. The anode of the controlled rectifier is connected to B+ with its cathode being connected to ground 10 through load resistor $R_{11-5}$, with a resistor $R_{11-6}$ being connected between the gate and cathode thereof. Thus upon transistor $T_{11-1}$ being turned off, the collector of transistor $T_{11-2}$ rises in potential and causes the controlled rectifier to switch to the low impedance state. An output is derived through connection 113 connected to the cathode of the controlled rectifier and applied to an input of the cranking motor control 40 and the igniter control 78 to turn them off. From the figure it will be seen that the controlled rectifier is powered from B+ and can be reset through reset relay by removal of this voltage. An identical circuit is provided to generate an output voltage when, and if, the turbine speed exceeds 31,200 r.p.m., which circuit is shown in the same figure with the components having the same designation with a prime superscript added. In other words, if the speed of the turbine exceeds this value, transistor $T_{11-1}$ will be turned off due to the lowering of the potential on input connection 201 to the base thereof, causing a positive voltage to be generated at the output thereof through connection 203, which voltage is applied to the input of the overspeed first out module 202.

An electrical schematic diagram of the normal lockout module 120 is shown in FIGURE 12, wherein a positive voltage input is applied to the gate of a controlled rectifier $Q_{12-1}$ through connection 121, resistor-capacitor combination $R_{12-1}$ and $C_{12-1}$ and blocking diode $D_{12-1}$. The anode of the controlled rectifier is connected to B++++, and the cathode is connected to ground potential 10 through load resistor $R_{12-2}$, with a biasing resistor $R_{12-3}$ being connected between the gate and the cathode thereof. An output is derived from the cathode of the controlled rectifier to connection 129 through blocking diode $D_{12-2}$. Upon the application to the input through connection 121 of a positive voltage, the controlled rectifier is switched to its low impedance state, which causes the voltage of the cathode thereof to rise and to apply a positive voltage at the output through connection 129. This output is then connected through blocking diode 128 as shown in FIGURE 1 to the igniter control 78, the fuel valve control 92, the coastdown lockout 126 and the first out relay 20, initiating shutdown of the turbine. This shutdown is initiated, it will be remembered, when the dropout timer generates a positive voltage output in response to the opening of the dropout contacts upon resumption of normal power. Another blocking diode $D_{12-3}$ is connected to the anode of diode $D_{12-1}$ from the first out relay through connection 147. As will be recalled from FIGURE 1, upon the generation of a positive voltage output by any of the first out modules indicating a malfunction, the first out relay is actuated which closes switch 143 therein to apply ground potential to all of the other first out modules to deactivate them, or prevent them from generating an output voltage in response to any other malfunction occurring later. Thus in the event that this has already occurred before the normal lockout module shown in FIGURE 12 generates an output voltage, ground potential will be applied to the cathode of diode $D_{12-3}$, causing it to conduct, and any subsequent positive voltage applied to the input connection 121 will not be effective in switching the controlled rectifier $Q_{12-1}$ to its low impedance state. Once the controlled rectifier in this circuit has been switched to the low impedance state, it will continue to conduct regardless of the fact that ground potential is now applied to the gate thereof through diode $D_{12-3}$. The circuit is reset and the controlled rectifier turned off only when the reset relay removes B+++ from the anode thereof.

An electrical schematic diagram of the coastdown lockout is shown in FIGURE 13 and includes an input through connection 127 from the normal lockout module 120 to the gate of a controlled rectifier $Q_{13-1}$ through the series connection of resistor $R_{13-1}$ and capacitor $C_{13-1}$. The controlled rectifier $Q_{13-1}$ is connected at its anode to B+++ and at its cathode to ground potential 10 through load resistor $R_{13-2}$, with a resistor $R_{13-3}$ being connected between the gate and cathode thereof. Moreover, diode $D_{13-1}$ is connected at its anode to the cathode of the controlled rectifier and at its cathode to input connection 127 to discharge capacitor $C_{13-1}$ at the proper time. A lamp $L_{13-1}$ is also connected between the cathode of the controlled rectifier and ground potential 10. When the normal lockout module generates a positive output voltage that is applied to connection 127, controlled rectifier $Q_{13-1}$ is switched to its low impedance state, causing lamp $L_{13-1}$ to become lit and indicate that shutdown has been initiated.

It will also be recalled that when the normal lockout module applies a signal to the input through connection 127, the same positive voltage is applied to the igniter control, the fuel valve control, and the first out relay to initiate shutdown of the turbine. When the speed of the turbine falls below 3,000 r.p.m., a positive voltage pulse is applied from the low r.p.m. pulse network 70 to another input through connection 151. This input connection is connected to one terminal of a charging capacitor $C_{13-2}$ through adjustable resistor $R_{13-4}$ and resistor $R_{13-5}$, with the other terminal of the capacitor being connected to ground potential 10. Thus charging of this capacitor is initiated at this time. The positive voltage side of the capacitor is also connected to the emitter of a unijunction transistor $U_{13-1}$ through diode $D_{13-2}$, wherein the unijunction transistor is connected between B+++ and ground potential through resistors $R_{13-6}$ and $R_{13-7}$, respectively. A biasing resistor $R_{13-8}$ is also connected between B+++ and the emitter of the unijunction transistor. When the voltage on the capacitor has attained a value sufficient to trigger the unijunction transistor, which will be determined by the time constant of the charging circuit, the unijunction transistor will discharge the capacitor and cause the voltage to rise at the interconnection of resistor $R_{13-7}$ and the base terminal of the unijunction transistor. This connection is also connected to the gate of another controlled rectifier $Q_{13-2}$ through another diode $D_{13-3}$, wherein the anode of this controlled rectifier is connected to B+++ and the cathode thereof is connected to ground potential through load resistor $R_{13-9}$. A biasing resistor $R_{13-10}$ is also connected between the gate of this controlled rectifier and its cathode. The conduction of the unijunction transistor causes the positive voltage to be applied to the gate of the controlled rectifier $Q_{13-2}$, causing it to switch to its low impedance state and the consequent rising of the voltage on its cathode. An output is derived from the cathode of this controlled rectifier through connection 23, which is applied to the input of the reset relay, the latter of which causes B+ and B+++ to be removed from the system. As noted earlier, the time between the generation of the positive voltage output at connection 23 and the application of the positive voltage input to connection 151 is approximately forty seconds to insure that the turbine has completely stopped. The removal of B+ and B+++ from the system resets the various circuits within the system, that is, switches the controlled rectifiers which are connected to B+ and B+++ to their high impedance states. In the coastdown lockout circuit itself, controlled rectifier $Q_{13-1}$ will cease conduction (as will $Q_{13-2}$) and the lamp $L_{13-1}$ will no longer burn.

An identical circuit is used for each of the first out modules as shown in the electrical schematic diagram of FIGURE 14, wherein this circuit is very similar to the normal lockout module previously described. A positive input voltage is applied to the input of the circuit to activate it through resistor $R_{14-1}$, the parallel connection of resistor $R_{14-2}$ and capacitor $C_{14-1}$, and diode $D_{14-1}$ connected to the gate of a controlled rectifier $Q_{14-1}$. This positive voltage can be derived from any malfunction detector, such as previously described in regard to the pyrometer control, which indicates ignition failure, or the high temperature exhaust delay indicating too high an exhaust temperature, or the high r.p.m. pulse network indicating overspeed, or the overcrank timer indicating that the turbine is being overcranked and has not attained a speed of 12,000 r.p.m. within a prescribed period of time, as examples. Moreover, this positive voltage input can be applied from other malfunction detectors, indicated generally as such in FIGURE 14 by a switch $S_{14-1}$ which, when closed, will be connected to a positive voltage, such as B++. These other malfunction detectors can be a meter and switch indicating low oil pressure, a meter and switch indicating high oil temperature, a suitable transducer or detector and switch indicating excessive vibration, the closing of a switch manually to shut down the system or any of several other malfunction detectors. The controlled rectifier $Q_{14-1}$ is connected at its anode to B++ and at its cathode to ground potential 10 through blocking diode $D_{14-3}$ and lamp $L_{14-1}$, with a biasing resistor $R_{14-3}$ being connected between the gate and the cathode of the controlled rectifier. An output is derived through connection 129 through blocking diode $D_{14-2}$ connected to the cathode of the controlled rectifier. Upon the application of a positive voltage to the input from the malfunction detector, the controlled rectifier is caused to conduct, thus producing a positive voltage at the output 129. This also causes the lamp to become lit so that the particular malfunction is visually indicated. It will be noted that the controlled rectifier is powered from B++ rather than B+ or B+++. In this case, therefore, the controlled rectifier continues to conduct after the reset relay has been actuated so that the operator has sufficient time to visually see lamp $L_{14-1}$ to determine the malfunction. Another blocking diode $D_{14-4}$ is connected at its cathode to the lamp from connection 280 so that the lamp can be tested by depressing the manual button-switch $S_{11}$. Since all of the connections for testing the lights are commonly connected, diode $D_{14-4}$ prevents all of the other lamps from being turned on when the controlled rectifier $Q_{14-1}$ conducts. Moreover, diode $D_{14-3}$ prevents the controlled rectifier from being turned on through resistor $R_{14-3}$ when the lamps are tested. Finally, another diode $D_{14-5}$ is connected at its anode to the gate of the controlled rectifier to prevent the latter from being switched to its low impedance state in the event any other first out module is first actuated, the cathode of diode $D_{14-3}$ being connected to line 147.

An electrical schematic diagram of the purge control circuit 250 is shown in FIGURE 15, wherein another controlled rectifier $Q_{15-1}$ is used to produce a positive voltage output when it is switched to its low impedance state by the application to the gate thereof of a positive voltage input. The controlled rectifier is connected at its anode to B++ through connection 245 and at its cathode to ground potential 10 through load resistor $R_{15-3}$. A manual purge switch $S_{10}$ is used to apply a positive voltage to the gate of the controlled rectifier from B++ through the parallel connection of resistor $R_{15-1}$ and capacitor $C_{15-1}$, resistor $R_{15-2}$ and blocking diode $D_{15-1}$, the latter of which is connected at its cathode to the gate of the controlled rectifier. Another biasing resistor $R_{15-4}$ is connected between the gate and cathode of the controlled rectifier, with the cathode of the switching device acting as the output for the circuit. By depressing switch $S_{10}$, the controlled rectifier is switched to its low impedance state to cause its cathode to rise toward B++. Thus a positive voltage output is applied to the input of the overcrank timer through connection 258, as shown. This same positive voltage output is also applied to the cranking relay input through blocking diode $D_{15-2}$ and connection 254, and to the inputs of each of the cranking motor control, the igniter control and the fuel valve control through blocking diode $D_{15-3}$ and connection 256. Thus start-up of the turbine is prevented during purging.

Should the turbine not be completely shut-down when purging is attempted, one or more various positive voltages will be applied to the input of the purge control to deactivate it. Should the turbine be in the process of being shut down, a positive voltage will be applied through connection 256, blocking diode $D_{15-4}$ and biasing resistors $R_{15-5}$ and $R_{15-6}$ to the base of a transistor $T_{15-1}$ to cause the transistor to conduct and the collector terminal thereof to fall toward ground. Because the anode of blocking diode $D_{15-1}$ is connected to the collector of this transistor, this will prevent a positive voltage from being applied to the gate of the controlled rectifier to switch it. It is assumed, of course, that the controlled rectifier is in the off state at this time, which condition is assured by positioning switch $S_2$ in the off position prior to starting the turbine to remove B++ from the anode of the controlled rectifier through connection 245. Similarly, the purge control circuit is deactivated by turning on transistor $T_{15-1}$ by a positive voltage applied through connection 99 and blocking diode $D_{15-6}$ from the fuel valve control when the turbine is running and fuel is being applied thereto, or by a positive voltage being applied through connection 254 and blocking diode $D_{15-5}$ from the cranking motor control output which is connected to the cranking relay input.

In view of the foregoing description, the importance of providing the three separate voltages B+, B++ and B+++ can be seen. Thus, the provision of the B++ voltage which supplies power to the first out modules insures that as long as the switch $S_1$ is in either the auto or manual position, power will be applied to the first out modules for the purpose of providing an indication of the malfunction that has resulted in shut down of the turbine and preventing operation of the cranking motor by either the purge control or cranking motor control. On the other hand, B+ is obtained through the reset relay 20 and through switch $S_1$, whereas voltage B+++ is obtained through the reset relay 20 directly from the battery 12. B+ voltage can therefore be removed either by operation of the switch $S_1$ to the off position or by operation of the reset relay 20, but once shutdown is initiated, B+++ will be removed from the coastdown lockout, the low r.p.m. pulse network, and the normal lockout module only responsive to operation of the reset relay 20. Is it therefore not possible to attempt to restart the motor once shutdown has been initiated until the reset relay 20 is operated by the coastdown lockdown responsive to a signal from the low r.p.m. pulse network.

It will be noted that the speed switch 62, the tachometer and meter relay 66, the low r.p.m. pulse network 70, and the high r.p.m. pulse network 110 all cooperate to provide signals upon the occurrence of specified speed conditions. However, other means for generating the required signals upon occurrence of the specified speeds can, of course, be utilized. However, if the speed switch 62 is not provided, it would remain desirable that a meter driving circuit be utilized in conjunction with the tachometer to provide necessary accuracy of operation. Further, in most turbine installations wherein it is permissible to initiate starting cycle during the coastdown period of the turbine, the time delay in the coastdown lockout can be eliminated. Further, if it is not considered desirable to prevent cutting on and off of the turbine, the dropout timer can also be eliminated. It can therefore be seen that those skilled in the art can make many changes and modifications to the specific embodiment of the invention described in the foregoing description which is intended to be illustrative and not limiting of the invention defined in the appended claims.

What is claimed is:
1. A control system for operating a gas turbine generator comprising:
 (a) means for producing a first signal when it is desired to operate said turbine generator and for removal of said first signal when said turbine generator is not to be operated;
 (b) first control means responsive to said first signal for producing an output signal for operating a motor for cranking said turbine and responsive to a second signal for the removal of said output signal;
 (c) second control means responsive to a third signal for producing an output signal for initiating operation of said turbine;
 (d) speed responsive means for producing said second and third signals applied respectively to said first and second means, at first and second speeds, respectively, of said turbine;

(e) third control means responsive to a stop signal for applying a fourth signal to said first and second control means, said first and second control means being effective to remove said output signals responsive to said fourth signal; and (f) means effective responsive to removal of said first signal for applying a stop signal to said third control means.

2. A control system as defined in claim 1 further including first timer means for being actuated responsive to said first signal to apply to said first and second control means a fifth signal to cause said first and second control means to remove the respective output signals and means for applying said second signal to said first timer means to prevent operation thereof whereby occurrence of said second signal prior to said fourth signal prevents occurrence of said fourth signal.

3. A control system as defined in claim 1 further including a fourth control means responsive to a fifth signal for producing an output signal for applying fuel to said turbine and means connecting said second and fourth control means to apply said fifth signal responsive to said third signal being applied to said second control means.

4. A control system as defined in claim 3 further including first timer means connected between said second and fourth control means for applying said fifth signal to said fourth control means at first preset time interval after application of said third signal to said second control means.

5. A control system as defined in claim 3 further including temperature sensing means for providing a signal indicating that the temperature of the turbine is below a minimum desired temperature, first timer means for providing an output signal at first preset time interval subsequent to occurrence of said output signal for applying fuel to said turbine, a fifth control means for producing a sixth signal responsive to a seventh signal applied thereto, means responsive to coincidence of said output signal from said first timer means and said signal indicating the temperature is below a minimum desired value for producing and applying said seventh signal to said fifth control means, and means for applying said sixth signal to said first, second and fourth control means to cause removal of their respective output signals.

6. A control system as defined in claim 1 wherein said means effective includes first timer means for establishing a preset time interval following removal of said first signal, said stop signal being applied only responsive to absence of said first signal subsequent to said preset time interval.

7. A control system for operating a gas turbine comprising:

(a) A cranking motor control activated in response to a first signal for operating a motor for cranking said turbine and deactivated in response to a second signal;

(b) An igniter control activated in response to a third signal for initiating ignition within said turbine and deactivated in response to said second signal;

(c) A fuel control activated in response to the activation of said igniter control for causing fuel to be supplied to said turbine;

(d) Speed responsive means for producing said second signal applied to said cranking motor control and said igniter control at a first predetermined speed of said turbine and for producing said third signal applied to said igniter control at a second predetermined speed of said turbine slower than said first predetermined speed;

(e) Said cranking motor control, said igniter control, and said fuel control each including a first semiconductive device having two terminals, said semiconductive device normally exhibiting a high impedance to the flow of current between said two terminals but capable of being switched responsive to a control signal applied thereto to a quasi stable law impedance state between said two terminals and which remains in the low impedance state as long as current flows between said two terminals;

(f) Means for applying a direct current supply voltage to one terminal of said first semiconductive device, said cranking motor control, said igniter control, and said fuel control, with the other terminal thereof being connected to energize a cranking motor, an igniter and a fuel valve, respectively;

(g) Means applying said first signal to said first device of said motor control as a control signal;

(h) Means applying said third signal to said first device of said igniter control as a control signal; and (i) Means responsive to said first device of said igniter control switching to the low impedance state for applying a control signal to said first device of said fuel control.

8. A control system as defined in claim 7 wherein said cranking motor control, said igniter control and said fuel control each includes a second semiconductive device of the same character as the first semiconductive device, means interconnecting said first semiconductive device and said second semiconductive device whereby turn on of said second semiconductive device is effective to cause said first semiconductive device associated therewith to return to the high impedance state and maintain said first semiconductive device in the high impedance state as said first signals and said third signals are applied thereto, and means responsive to a stop signal for applying control signals to the second device of each of the cranking motor control, the igniter control and the fuel control.

9. A control system as defined in claim 8 wherein said first and second devices are silicon controlled rectifiers.

10. A control system as defined in claim 8 further including means effective responsive to a signal from the speed responsive means indicating that the speed of the turbine has decreased to a third predetermined speed less than said first predetermined speed for disconnecting said direct current power source from the first and second semiconductive devices of each of said motor control, igniter control and fuel control circuits for resetting same.

11. A control system as defined in claim 10 further including a time delay means for providing a preset time interval between application of said fourth signal and disconnection of said power.

12. A control system for automatically starting and stopping a gas turbine generator in response to interruption and resumption of primary power comprising:

(a) A dropout switch and means for closing said dropout switch responsive to absence of primary power;

(b) Means connected for applying a first signal to a dropout timer, an overcrank timer, and a cranking motor control when said dropout switch is closed;

(c) Speed responsive means for producing a second signal as the speed of the turbine increases through a first level and a third signal when the speed of the turbine attains a second, higher level;

(d) Switching means for producing a fourth signal responsive to operation thereof;

(e) Said dropout timer and said overcrank timer each having outputs connected to said switching means, said dropout timer producing a fifth signal to actuate said switching means a first time interval after determination of said first signal and said overcrank timer producing a sixth signal to actuate said switching means a second time interval after the first signal is applied to said overcrank timer; and (f) Said cranking motor control being responsive to said first signal for producing a seventh signal for operating a cranking motor for cranking said turbine and responsive to said third and fourth signals for the removal of said output signal, and said igniter control means being activated in response to said second signal for initiating ignition within said engine is deactivated in response to said third or fourth signals.

13. A control system as defined in claim 12 wherein said speed responsive means is further effective for producing an eighth signal as the speed of the turbine decreases through a third level and further including means responsive to said fourth signal for preventing restarting of said gas turbine until generation of said eighth signal.

14. A control system as defined in claim 13 wherein said means for generating said eighth signal includes a timer means whereby said eighth signal is generated a predetermined interval of time following said turbine decreasing through said third speed level.

15. A control system as defined in claim 12 further including a fuel control and means for applying an eighth signal to said fuel control responsive to said second signal being applied to said eighth signal.

16. A control system as defined in claim 15 further including a fuel delay timer for generating said eighth signal a set time interval after said second signal is applied to said igniter control.

17. A control system as defined in claim 15 further including a pyrometer control, a pyrometer, and an ignition failure timer, means responsive to said eighth signal being applied to said fuel control for actuating said timer to provide an output signal to said pyrometer control a time interval thereafter, said pyrometer control being connected to apply a signal to operate said switching means responsive to coincidence of a signal from said ignition failure timer and a signal from said pyrometer indicating a temperature below normal.

References Cited

UNITED STATES PATENTS 2,866,385  12/1958  Miller _____ 60—39.14 X
2,938,338  5/1960  Creswick et al. _____ 60—39.14

JULIUS E. WEST, *Primary Examiner.*